US011217916B2

(12) United States Patent
Stecewycz

(10) Patent No.: US 11,217,916 B2
(45) Date of Patent: Jan. 4, 2022

(54) AUTOMOTIVE BOOSTER CABLE SYSTEM

(71) Applicant: Joseph Stecewycz, Groton, MA (US)

(72) Inventor: Joseph Stecewycz, Groton, MA (US)

(73) Assignee: Cytherean Mandelbrot LLC, Groton, MA (US)

( * ) Notice: Subject to any disclaimer, the term of this patent is extended or adjusted under 35 U.S.C. 154(b) by 0 days.

(21) Appl. No.: 16/953,319

(22) Filed: Nov. 19, 2020

(65) Prior Publication Data

US 2021/0075133 A1 Mar. 11, 2021

Related U.S. Application Data

(62) Division of application No. 15/853,946, filed on Dec. 25, 2017, now Pat. No. 10,862,231.

(51) Int. Cl.
| | |
|---|---|
| *H02J 7/34* | (2006.01) |
| *H01R 11/16* | (2006.01) |
| *H02J 7/00* | (2006.01) |
| *H01R 11/28* | (2006.01) |
| *B60R 16/03* | (2006.01) |
| *H02J 1/10* | (2006.01) |

(52) U.S. Cl.
CPC .......... *H01R 11/16* (2013.01); *H01R 11/287* (2013.01); *H01R 11/288* (2013.01); *H02J 7/0034* (2013.01); *H02J 7/342* (2020.01); *B60R 16/03* (2013.01); *H02J 1/122* (2020.01); *H02J 7/0045* (2013.01)

(58) Field of Classification Search
CPC ....... H02J 7/00; H02J 7/0034; H02J 2001/006
See application file for complete search history.

(56) References Cited

U.S. PATENT DOCUMENTS

| | | | | |
|---|---|---|---|---|
| 5,921,809 A | * | 7/1999 | Fink | H01R 11/288 439/504 |
| 9,368,912 B1 | * | 6/2016 | Sullivan | H01R 11/288 |

* cited by examiner

*Primary Examiner* — Charlie Y Peng
(74) *Attorney, Agent, or Firm* — Joseph Stecewycz

(57) ABSTRACT

An automotive booster cable system includes a first battery clamp attached to a first battery a second battery clamp attached to a second battery; an optional electrical plug adapter with an adapter electrical connector for mating with the second battery clamp; and a booster cable assembly having a first polarized electrical booster connector for mating with the first battery clamp and a second polarized electrical booster connector for mating with either the electrical plug adapter or the second battery clamp.

2 Claims, 21 Drawing Sheets

Section A-A

Section B-B

Section C-C

Section D-D

Section E-E

Section F-F

Section G-G

Section H-H

Section J-J

AUTOMOTIVE BOOSTER CABLE SYSTEM

FIELD OF THE INVENTION

This invention relates to electrical cable modular assemblies designed to provide a method of electrically connecting the terminals of two automotive batteries for charging purposes and, in particular, electrical booster cable components for enabling the average motorist to easily set up and perform such an automotive "jump-starting" operation.

BACKGROUND OF THE INVENTION

Battery booster cables, such as widely used in jump-starting a vehicle, have been known in the art for years. As shown in FIG. 1, a conventional booster cable 10 typically includes two red booster cable clamps 12 and two black booster cable clamps 14, connected by a length of paired insulated electrical conductors that includes a red insulated electrical conductor 16 and a black insulated electrical conductor 18. Each of the insulated electrical conductors 16, 18 has a sufficient cross sectional area to safely conduct high amperage starting current. The booster cable clamps 12, 164 sometimes referred to as "crocodile clips," feature serrated jaws for use with various configurations of an automotive battery.

The automotive battery typically includes a positive battery terminal and a negative battery terminal. When the automotive battery is installed in an engine compartment, an automotive battery power cable with a positive battery terminal clamp is usually attached to the positive battery terminal, and an automotive battery ground cable with a negative battery terminal clamp is usually attached to the negative battery terminal.

The booster cable clamps 12, 14 are spring-loaded and can normally be opened sufficiently to be clamped onto battery terminal clamps. The conventional booster cable 10 enables the electrical coupling of the automotive battery to a remote power source, usually a second automotive battery in another vehicle. The booster cable clamps 12, 14 are thus configured to enable mechanical and electrical contact with: (i) the vehicle battery terminal clamps, if the battery is installed in a vehicle, or (ii) the battery terminals, if the battery is not in a vehicle.

As is well-known in the relevant art, conventional booster cables 10 suffer from the shortcoming that the serrated ends of the booster cable clamps 12, 14, which are typically made from copper or a copper alloy, produce indentations and scratches on the battery terminals or on the battery terminal clamps. The battery terminals and the battery terminal clamps are normally made from lead—a metal softer than copper. Over time, the outer surfaces of the battery terminals or the battery terminal clamps may deteriorate from repeated attachment of the conventional booster cable 10, especially when the user twists and turns the booster cable clamps 12, 14 while clamped onto the battery terminal clamps to insure good electrical contact.

Another shortcoming is that one or both of the battery clamps 12, 14 may accidentally make contact with the vehicle chassis or the engine compartment when a user is in the process of connecting or disconnecting the conventional booster cable 10 from the automotive battery. If the vehicle has a negative-ground system, and it is the negative battery clamp 14 that is dropped, a short circuit may result by conducting electrical current from the positive battery terminal into the chassis or onto an engine component, producing electrical arcing or sparking, and possibly igniting hydrogen gas being generated in the process of charging the battery.

A further shortcoming is that the process of connecting the conventional booster cable 10 to the automotive battery typically requires using both hands to prevent the booster clamp 12 from contacting the booster clamp 14, so as to not short out the power source at the other end of the conventional booster cable 10. One-handed operation is not a practical alternative. Moreover, an average motorist may be unclear as to the proper polarity that must be observed when connecting two batteries in two different vehicles. Although many automotive lead-acid batteries have positive (+) and negative (−) indicators near the battery terminals, or a red coloring on the automotive battery cable, these markings may not be readily seen if the surface of the battery is soiled from oil, dirt, or white chemical powder at a battery terminal. Observing proper polarity when trying to jump-start a vehicle at night, or under similar poor lighting conditions, presents a further challenge to a jump-starting set up.

What is needed is a battery charging apparatus that overcomes the limitations of the prior art by: (i) providing a method of electrically connecting to automotive battery terminals and clamps without causing surface damage to the lead-based components, (ii) providing a good electrical contact to the battery terminals and clamps, (iii) assuring proper polarity between power source and the automotive battery, and (iv) enabling one-handed operation to connect the power source to the automotive battery. Such a new and improved battery charging apparatus may well phase out the conventional booster cable 10 and render the serrated booster cable clamps 12, 14 essentially obsolete.

BRIEF SUMMARY OF THE INVENTION

In an aspect of the present invention, an automotive battery clamp suitable for attachment to the positive and negative terminals of an automotive battery comprises: a clamp housing having a first end and an opposed second end; a first terminal contact extending from the first end of the housing, the terminal contact placed in electrical contact with the positive battery terminal; a second terminal contact extending from the second end of the clamp housing, the second terminal contact placed in electrical contact with the negative battery terminal; a first electrical contact opening in the clamp housing; a first electrical contact pad secured in the first electrical contact opening; a second electrical contact opening in the clamp housing; a second electrical contact pad secured in the first electrical contact opening; a first conductive line disposed inside the clamp housing, the first conductive line electrically connecting the first terminal contact with the first electrical contact pad; and a second conductive line disposed inside the clamp housing, the second conductive line electrically connecting the second terminal contact with the second electrical contact pad; whereby a source of charging current can be applied to the automotive battery terminals via the first electrical contact opening and the second electrical contact opening.

In another aspect of the present invention, a battery charging system comprises: a first automotive battery clamp mounted on a first automotive battery; a second automotive battery clamp mounted on a second automotive battery; and a booster cable assembly having a first electrical connector at a first end and a second electrical connector at a second end, the first electrical connector adapted to electrically mate with the first automotive battery clamp, and the second electrical connector adapted to electrically mate with the second automotive battery clamp.

In another aspect of the present invention, a method of connecting a first automotive battery to a second automotive battery for charging purposes, the method comprising the steps of: mounting a first automotive battery clamp on the first automotive battery; mounting a second automotive battery clamp on the second automotive battery; providing a booster cable assembly having a first electrical connector at a first end and a second electrical connector at a second end; attaching the first electrical connector to the first automotive battery clamp; and attaching the second electrical connector to the second automotive battery clamp.

The additional features and advantage of the disclosed invention is set forth in the detailed description which follows, and will be apparent to those skilled in the art from the description or recognized by practicing the invention as described, together with the claims and appended drawings.

BRIEF DESCRIPTION OF THE DRAWINGS

The uses and advantages of the present invention will be more fully appreciated as the same becomes better understood from the following detailed description of the present invention when viewed in conjunction with the accompanying figures, in which.

DETAILED DESCRIPTION OF THE INVENTION

Various exemplary embodiments of the present invention are described in the text below, each with reference to the appropriate Figure(s). It should be understood that, for clarity of illustration, not all disclosed battery clamp system components are shown to the same scale, or in correct proportion to one another, and should not be taken as literal illustrations of actual clamp system components. In addition, although many clamp system components are presented with straight edges, corners, and flat surfaces, present-day manufacturing methods can produce these components having curved surfaces, rounded edges, and suitable fillets. Also, the S.A.E. post-type batteries and the side-terminal batteries shown are merely representative of the various configurations of automobile lead acid batteries in widespread usage, and the illustrations shown are generalized and should not be taken as limiting the application of the present invention. In particular, the disclosed battery clamp components can be utilized on L-terminal batteries, on stud-terminal batteries, and on combined S.A.E. and stud type batteries.

Figure 1:
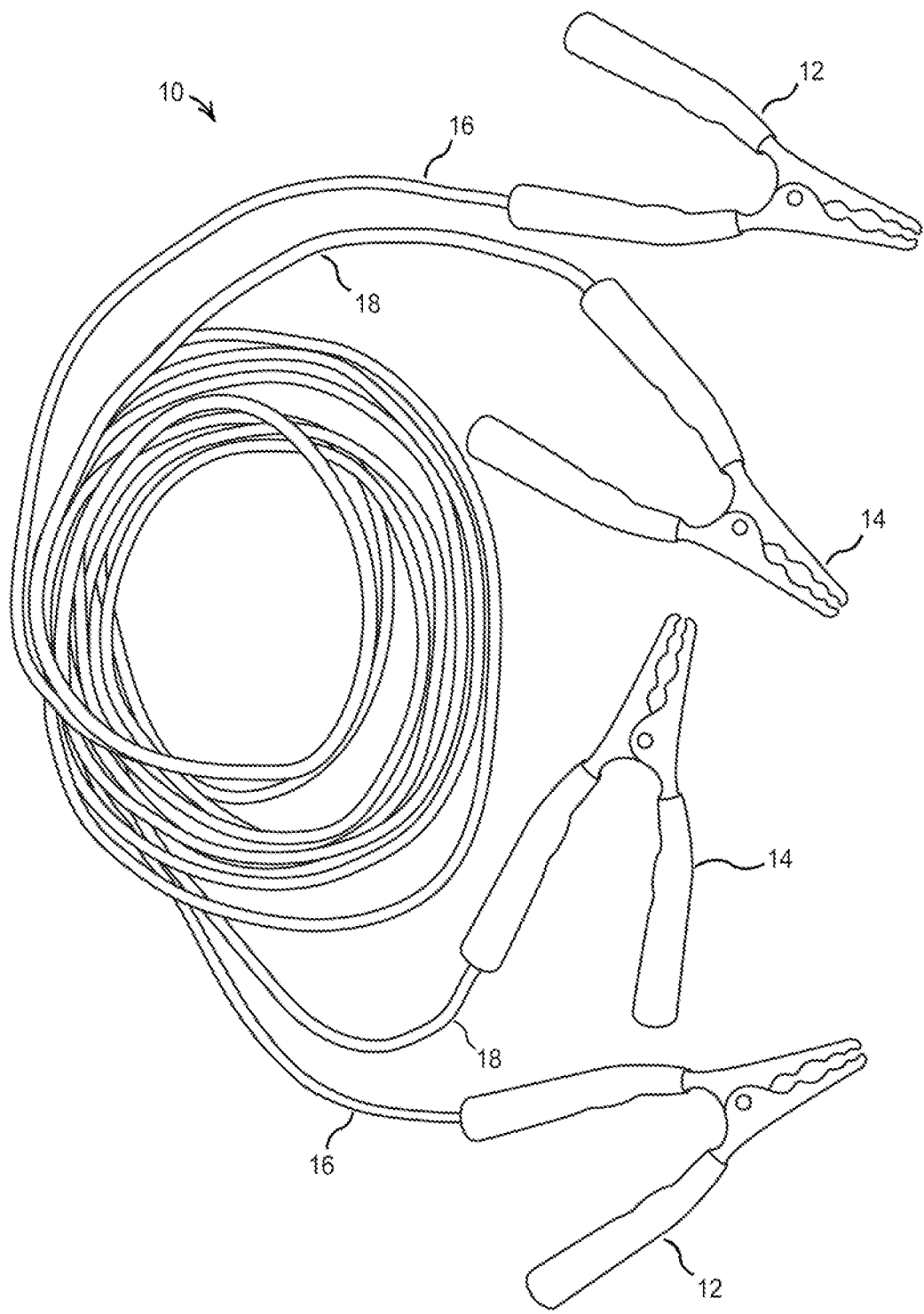
FIG. 1 is an illustration of a battery booster cable set, in accordance with the present state of the art.
Figure 2:
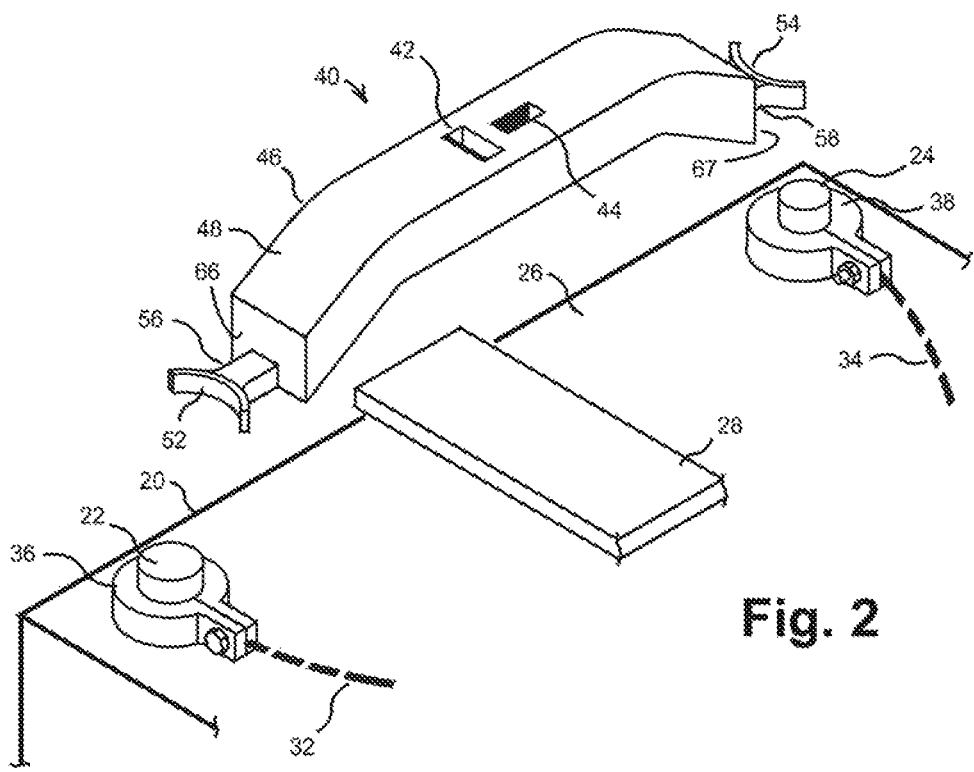
FIG. 2 is a diagrammatical illustration showing an automotive battery transverse clamp, in accordance with an aspect of the present invention.

There is shown in FIG. 2 a diagrammatical isometric view of an exemplary embodiment of an automotive battery transverse clamp 40, in accordance with an aspect of the present invention. The automotive battery transverse clamp 40 includes a transverse clamp housing 46 having, extending from a first housing end 66, a positive terminal arcuate contact 52 with a positive contact support 56, and extending from a second housing end 67, a negative terminal arcuate contact 54 with a negative contact support 58. The contact supports 56, 58 provide structural support to position the respective terminal arcuate contacts 52, 54 as described below.

The positive terminal arcuate contact 52, the negative terminal arcuate contact 54, the positive contact support 56, and the negative contact support 58 may be fabricated from an electrically conductive material, such as a copper alloy or other electrically-conductive material or metal. The transverse clamp housing 46 may be fabricated from an electrically non-conductive material such as, for example, a plastic-based material, or a rubber-based material.

The transverse clamp housing 46 includes a positive electrical contact opening 42 and a negative electrical contact opening 44 in a transverse cable housing surface 48. In the embodiment shown, the positive electrical contact opening 42 and the negative electrical contact opening 44 are each substantially rectangular in shape. The positive electrical contact opening 42 is oriented at an angle to the negative electrical contact opening 44 so as to provide a polarized electrical configuration.

In the illustration, the automotive battery transverse clamp 40 is positioned for installation onto an automotive battery 20, where the automotive battery 20 may be secured in an automobile engine compartment with a battery hold-down bracket 28 positioned on an upper battery surface 26. The automotive battery 20 includes a positive post terminal 22 and a negative post terminal 24, in accordance with Society of Automotive Engineer (SAE) standards. A positive battery terminal clamp 36 may be used to connect an automotive battery power cable 32 (represented by a dashed line for clarity of illustration) to the positive post terminal 22. A negative battery terminal clamp 38 may be used to connect an automotive battery ground cable 34 (also represented by a dashed line) to the negative post terminal 24.

Figure 3:
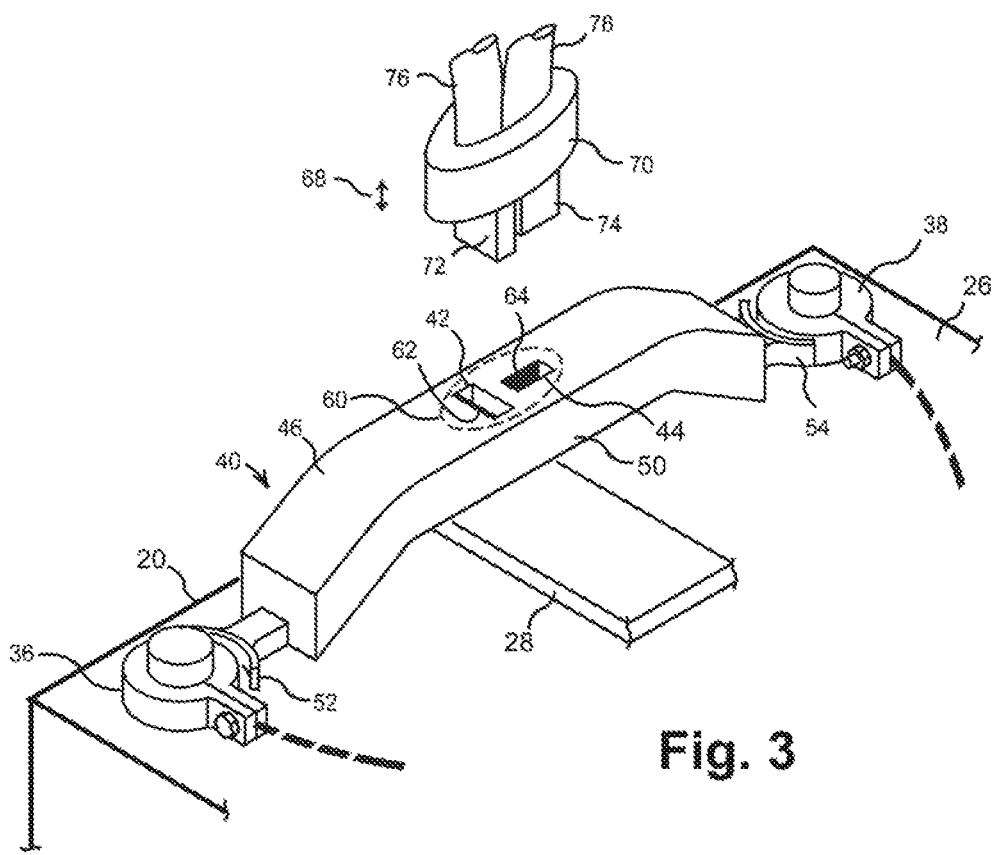
FIG. 3 is a diagrammatical illustration of the automotive battery transverse clamp of FIG. 1 as installed on an automotive battery.

FIG. 3 shows the automotive battery transverse clamp 40 installed on the automotive battery 20. When so installed, the positive terminal arcuate contact 52 is in physical and electrical contact with the positive battery terminal clamp 36, and the negative terminal arcuate contact 54 is in physical and electrical contact with the negative battery terminal clamp 38. However, it should be noted that, tor clarity of illustration, the positive terminal contact 52 is here shown spaced apart from the positive battery terminal clamp 36, and the negative terminal contact 54 is shown as spaced apart from the negative battery terminal clamp 38.

As can be seen from the illustration, the battery transverse clamp 40 has an offset transverse clamp housing central section 50 giving the battery transverse clamp a somewhat angular shape, as viewed from the front. This configuration provides a clearance between the battery transverse clamp 40 and the battery hold-down bracket 28 when the automotive battery transverse clamp 40 is properly installed on the automotive battery 20.

The automotive battery transverse clamp 40 is further configured to maintain electrical contact with both the positive battery terminal clamp 36 and the negative battery terminal clamp 38 after the automotive battery transverse clamp 40 has been installed as shown. The angular shape of the transverse clamp housing 46 allows a user to slightly flex inwardly the automotive battery transverse clamp 40, so as to move the positive terminal arcuate contact 52 towards the negative terminal arcuate contact 54, before placing the automotive battery transverse clamp 40 between the positive battery terminal clamp 36 and the negative battery terminal clamp 38. Once thus emplaced, and when the battery transverse clamp 40 is released by the user, the terminal arcuate contacts 52, 54 are urged against respective battery terminal clamps 36, 38.

In an exemplary embodiment, the radius of curvature of the positive terminal arcuate contact 52 is less than the outer circumference of the positive battery terminal clamp 36. This configuration serves to provide a spring-like action when the positive terminal arcuate contact 52 is urged against the positive battery terminal clamp 36. For the same reason, the radius of curvature of the negative terminal arcuate contact 54 is less than the outer circumference of the negative battery terminal clamp 38.

A positive contact pad 62 is secured inside the positive electrical contact opening 42, and a negative contact pad 64 is secured inside the negative electrical contact opening 44. The positive contact pad 62 and the negative contact pad 64 may be fabricated from an electrically conductive material, such as a copper alloy or other metal or electrically-conductive material. The combination of the positive electrical contact opening 42, the positive contact pad 62, the negative electrical contact opening 44, and the negative contact pad 64 provide a virtual electrical booster receptacle 60 for the insertion of an electrical booster plug 70.

The electrical booster plug 70 includes a positive electrical prong 72 having a cross-sectional shape conforming to the perimeter of the positive electrical contact opening 42, and a negative electrical prong 74 having a cross-sectional shape conforming to the perimeter of the negative electrical contact opening 44. The electrical prongs 72, 74 are relatively spaced and oriented to mate with the respective electrical contact openings 42, 44, as indicated by arrow 68.

A positive insulated conductor 76 is electrically connected to the positive electrical prong 72, and a negative insulated conductor 78 is electrically connected to the negative electrical prong 74. With the automotive battery transverse clamp 40 secured to the automotive battery 20, electrical charging current can be provided to the automotive battery 20 via the insulated conductors 76, 78, as described in greater detail below. It can be appreciated that the electrical booster plug 70 is polarized to prevent a reverse polarity electrical connection.

Figure 4:
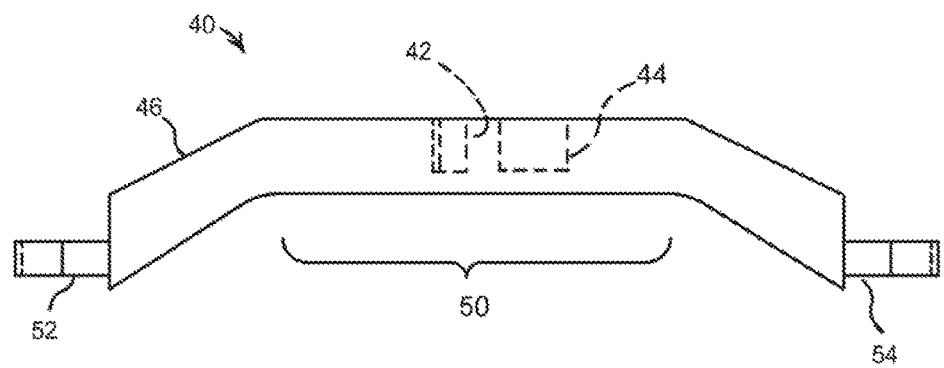
FIG. 4 is a front view of the automotive battery transverse clamp of FIG. 2.

FIG. 4 is a front view of the transverse battery clamp 40 showing the relative locations of the positive terminal contact 52, the negative terminal contact 54, the front of the transverse clamp housing 46, the positive electrical contact opening 42, the negative electrical contact opening 44, and the transverse clamp housing central section 50.

Figure 5:
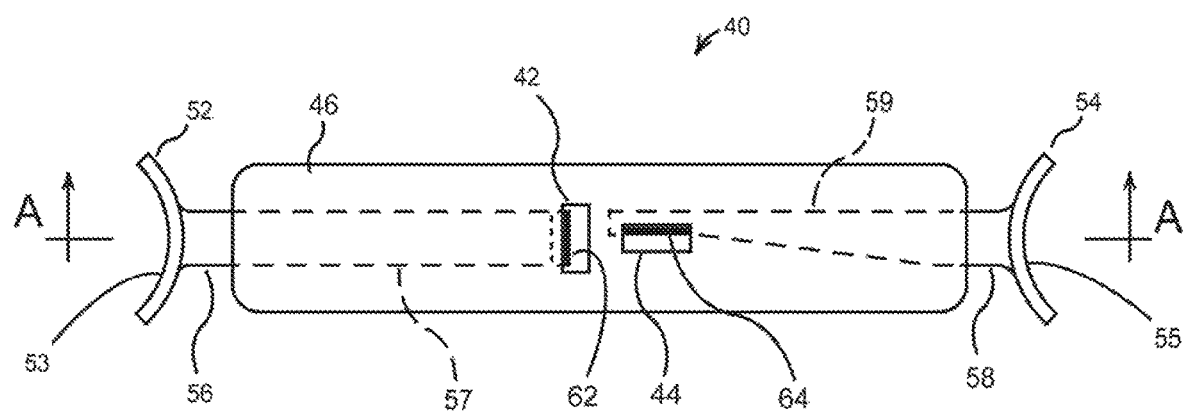
FIG. 5 is a top view of the automotive battery transverse clamp of FIG. 2.

FIG. 5 is a top view of the transverse battery clamp 40 showing the relative locations of the positive terminal contact 52, the positive terminal contact support 56, the negative terminal contact 54, the negative terminal contact support 58, the top of the transverse clamp housing 46, the positive electrical contact opening 42, and the negative electrical contact opening 44. A positive conductive line 57 is an electrical conductor functioning to conduct electrical current between the positive terminal contact 52 and the positive conductive pad 62. A negative conductive line 59 is an electrical conductor functioning to conduct electrical current between the negative terminal contact 54 and the negative conductive pad 64.

The cross sectional dimensions of the conductive lines 57, 59 are sufficiently large to safely conduct the electrical current required for jump starting a vehicle. The positive terminal contact support 56 provides a transition from the cross sectional geometry of the positive conductive line 57 to the geometry of the positive terminal contact 52. In an exemplary embodiment, the positive conductive line 57 can be connected directly to the positive terminal contact 52, without the need for the positive terminal contact support 56, if the positive terminal contact 52 can be oriented to make contact with the positive battery terminal clamp 36 across the entire concave face 53 of the positive terminal contact support 56. The negative conductive line 59 can similarly be connected directly to the negative terminal contact 54, without the need for the negative terminal contact support 58, if the negative terminal contact 54 can be oriented to make contact with the negative battery terminal clamp 36 across the entire concave face 55 of the negative terminal contact 54.

Figure 6:
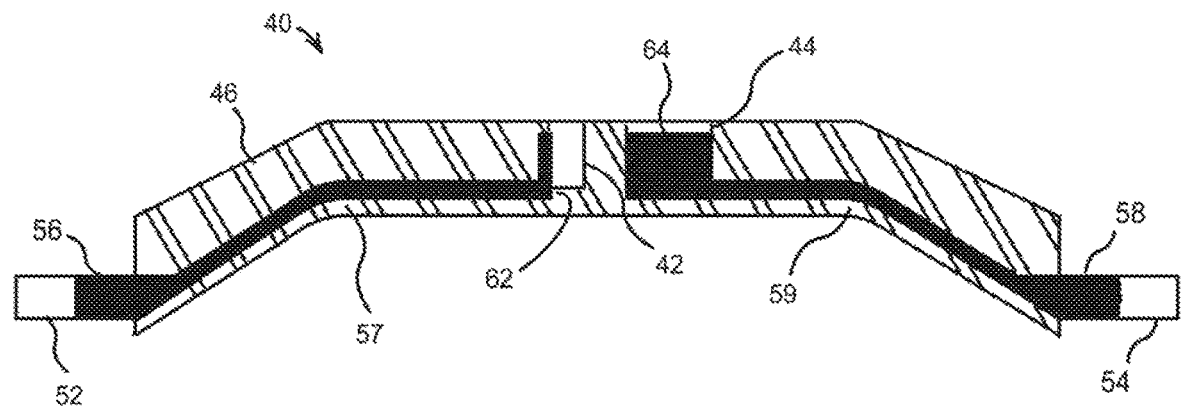
FIG. 6 is a cross-sectional view of the automotive battery transverse clamp of FIG. 5.

FIG. 6 is a cross sectional view A-A of the transverse battery clamp 40 showing the positive terminal contact 52, the positive terminal contact support 56, the negative terminal contact 54, the negative terminal contact support 58, the positive electrical contact opening 42, and the negative electrical contact opening 44. The positive conductive pad 62 is attached to an inside surface of the positive electrical contact opening 42. The positive conductive line 57 is shown between the positive terminal contact 52 and the positive conductive pad 62. The negative conductive pad 64 is attached to an inside surface of the negative electrical contact opening 44. The negative conductive line 59 is shown between the negative terminal contact 54 and the negative conductive pad 64.

The transverse clamp housing 46 serves to isolate the positive conductive line 57 and the positive conductive pad 62 from the negative conductive line 59 and the negative conductive pad 64. The transverse clamp housing 46 further functions to protect the conductive elements 62, 64, 57, 59 from environmental degradation. The conductive pads 62, 64 are of sufficient surface area to safely conduct electrical charging current from the conductive lines 57, 59 to the respective electrical prongs 72, 74 shown in FIG. 3.

In an exemplary embodiment, the positive conductive line 57 may be connected to two or more positive conductive pads (not shown) attached to two, three, or all four inside surfaces of the positive electrical contact opening 42. This configuration would provide a greater contact surface area to minimize any voltage drop across the mating interface between the two or more positive conductive pads in electrical contact with the positive electrical prong 72. Similarly, the negative conductive line 59 may be connected to two or more negative conductive pads (not shown) attached to two, three, or all four inside surfaces of the negative electrical contact opening 44.

Figure 7:
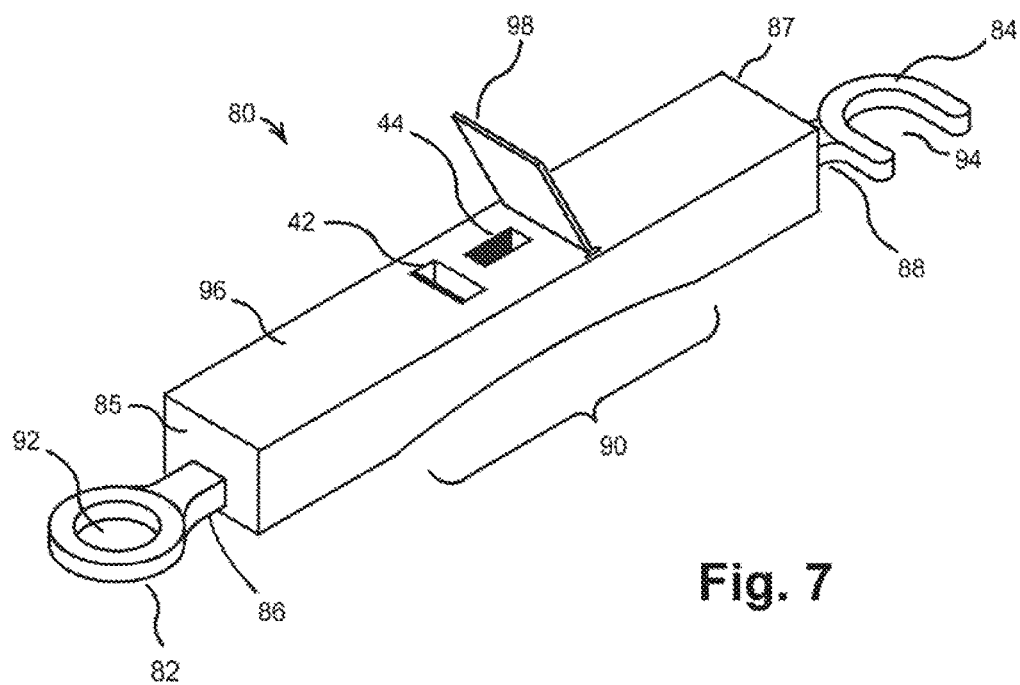
FIG. 7 is an isometric diagrammatical view of the view of an automotive battery transverse clamp having a hinged receptacle cover and lug contacts, in accordance with an aspect of the present invention.

FIG. 7 shows a modified automotive battery transverse clamp 80, configured for attachment onto the post terminals 22, 24 (not shown). This configuration provides for a more permanent attachment than the attachment configuration of the automotive battery transverse clamp 40, shown above. A housing central recess 90 may be provided to aid in the installation of the modified automotive battery transverse clamp 80 onto the automotive battery 20 (not shown). The automotive battery transverse clamp 80 may include a hinged protective cover 98 to prevent dust and moisture from entering the positive electrical contact opening 42 or the negative electrical contact opening 44.

The battery transverse clamp 80 comprises a transverse clamp housing 96 having a positive terminal annular lug 82 on a positive lug support 86 at a first end 85, and having a negative terminal spade lug 84 on a negative lug support 88 at a second, opposed end 87. The positive terminal annular lug 82 has a circular opening 92 sized to fit over the positive post terminal 22 (not shown). The negative terminal spade lug 84 has a U-shaped opening 94 sized for placement around the negative post terminal 24 (not shown). The positive terminal annular lug 82 is retained beneath the positive battery terminal clamp 36 (not shown), and the negative terminal spade lug 84 is retained beneath the negative battery terminal clamp 38 (not shown).

The lug supports 86, 88 serve to provide clearance for the battery terminal clamps 36, 38 to be placed onto the post terminals 22, 24 when the battery transverse clamp is installed on the automotive battery 20. It should be understood that the positive terminal annular lug 82 can alternatively be configured as a spade lug, and that the negative terminal spade lug 84 can alternatively be configured as an annular lug.

Figure 8:
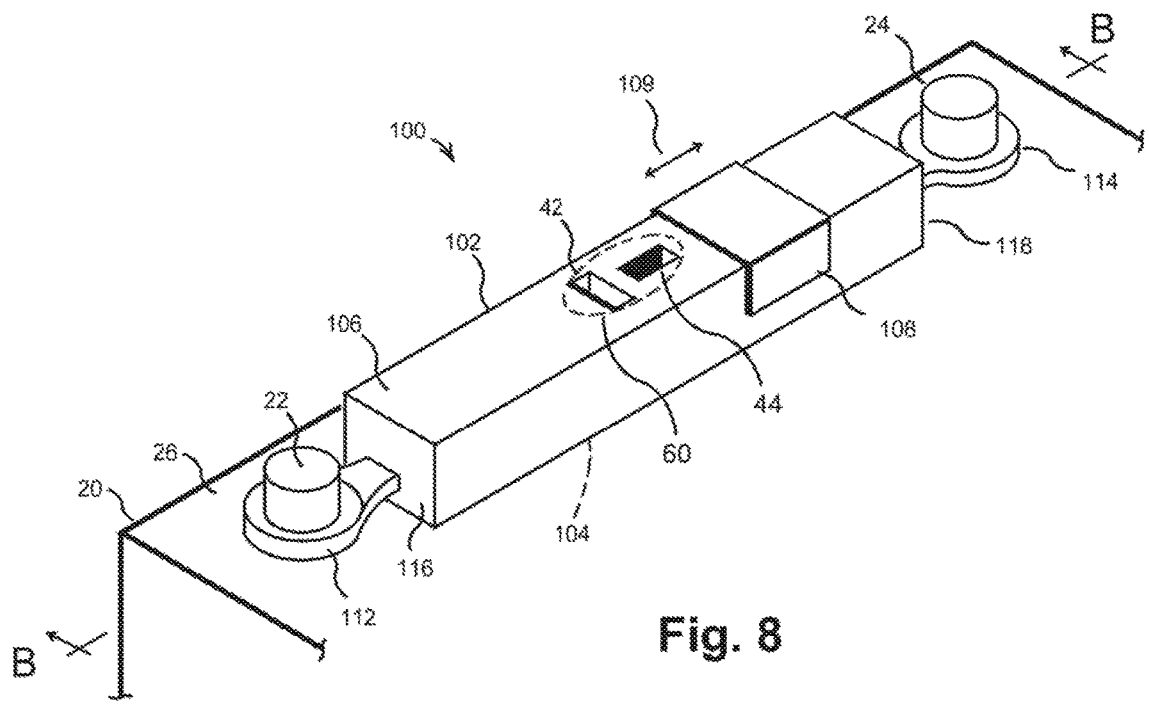
FIG. 8 is an isometric diagrammatical view of the view of a flush mounted automotive battery transverse clamp having a sliding receptacle cover and lug contacts, in accordance with an aspect of the present invention.

There is shown in FIG. 8 an exemplary embodiment of a flush-mounted automotive battery transverse clamp 100. A transverse clamp housing 102, which may be fabricated from a plastic or rubber electrically non-conductive material, does not have the offset configuration of the transverse clamp housing central section 50, seen in FIG. 3, but rather includes a substantially planar transverse clamp housing mounting surface 104. Accordingly, the automotive battery transverse clamp 100 in FIG. 8 is intended for attachment to an automotive battery 20 in which the battery hold-down bracket 28 is not present on the upper battery surface 26, as is the configuration of FIG. 3.

The transverse clamp housing 102 includes a transverse clamp housing electrical interface surface 106 with the positive electrical contact opening 42 and the negative electrical contact opening 44 forming the virtual electrical booster receptacle 60, as described above. A detachable electrical receptacle cover 108 may be provided for sliding over and off the electrical booster receptacle 60, as indicated by arrow 109.

Figure 9:
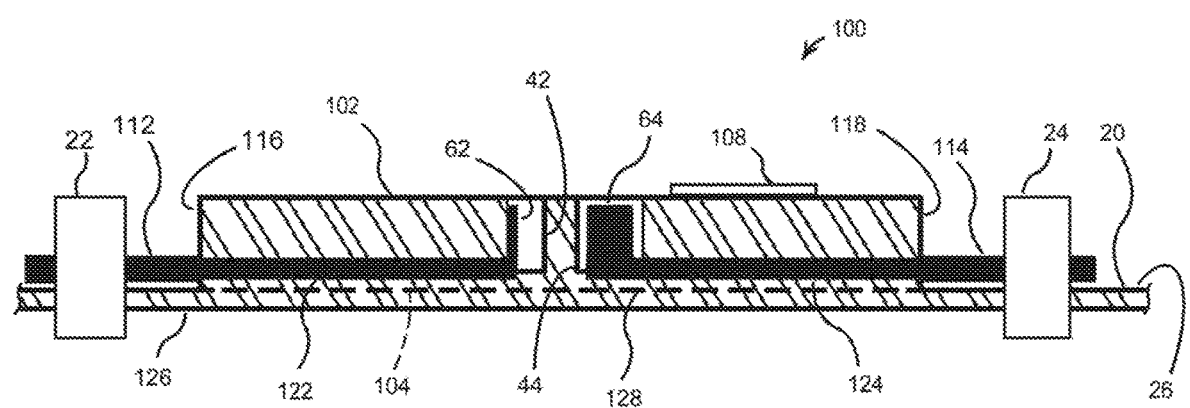
FIG. 9 is a cross-sectional view of the flush-mounted automotive battery transverse clamp of FIG. 8.

With additional reference to the cross-sectional view B-B of FIG. 9, the automotive battery transverse clamp 100 includes a positive terminal annular lug 112 at a first end 116 of the transverse clamp housing 102, and a negative terminal annular lug 114 at an opposed, second end 118. It should be understood that either or both the terminal annular lugs 112, 114 can be replaced by one or two spade lugs for a particular application. The positive terminal annular lug 112 is configured and positioned for placement over the positive post terminal 22, and the negative terminal annular lug 114 is configured and positioned for placement over the negative post terminal 24. The detachable electrical receptacle cover 108 is positioned in the illustration so as to expose the electrical contact openings 42, 44.

It can be seen that a positive conductive line 122 provides an electrical connection between the positive terminal annular lug 112 and the positive contact pad 62. A negative conductive line 124 provides an electrical connection between the negative terminal annular lug 114 and the negative contact pad 64. The transverse clamp housing mounting surface 104 may be placed on a battery case wall 126 to form a planar interface with the upper battery surface 26. It can be appreciated by one skilled in the relevant art that the conductive lines 122, 124 are of sufficient cross sectional area and conductivity to safely conduct the electrical current required for jump starting an automobile engine using a typical automotive battery.

In an exemplary embodiment, an adhesive may be applied between the transverse clamp housing 102 and the upper battery surface 26 to form a bond region 128 so as to permanently attach the automotive battery transverse clamp 100 to the automobile battery 20. In an alternative exemplary embodiment, the transverse clamp housing 102 may be fabricated as part of the battery case wall 126 during manufacture of the automotive battery 20 to form a molded, unitary component that includes the automobile battery 20 with the transverse clamp housing 102.

Figure 10:
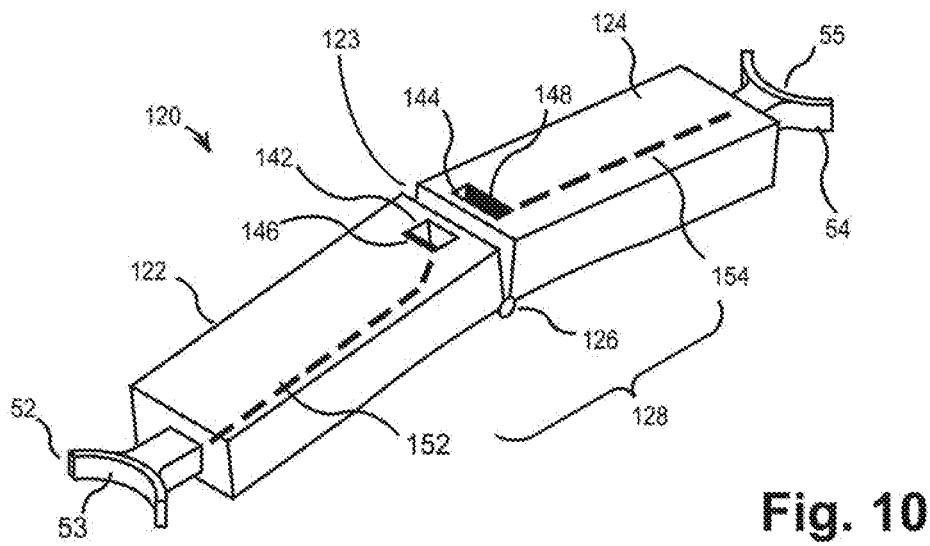
FIG. 10 is an isometric diagrammatical view of the view of a hinged automotive battery transverse clamp, in accordance with an aspect of the present invention.

In FIG. 10, a spring-loaded automotive battery transverse clamp 120 is configured as a bi-sectional hinged clamp. The spring-loaded automotive battery transverse clamp 120 includes a transverse battery clamp positive section 122 connected by a spring-loaded hinge 126 to a transverse battery clamp negative section 124. The spring-loaded automotive battery transverse clamp 120 can be flexed, against the force of the spring-loaded hinge 126, to define a wedge-shaped gap 123 between the transverse battery clamp positive section 122 and the transverse battery clamp negative section 124.

A concave section 128 may be provided in the automotive battery transverse clamp 120 for ease of removal. In the illustration, the spring-loaded transverse battery clamp positive section 122 is flexed at a slight angle with respect to the transverse battery clamp negative section 124. The transverse battery clamp positive section 122 includes the positive terminal arcuate contact 52 and a positive electrical contact opening 142. The transverse battery clamp negative section 124 includes the negative terminal arcuate contact 54 and a negative electrical contact opening 144.

The transverse battery clamp positive section 122 includes the positive terminal contact 52 electrically connected to a positive conductive pad 146, that is secured inside the positive electrical contact opening 142, via a positive conductive line 152 (represented by a dashed line for clarity of illustration). The transverse battery clamp negative section 124 includes the negative terminal contact 54 electrically connected to a negative conductive pad 148 that is secured inside the negative electrical contact opening 144, via a negative conductive line 154. In the illustration provided, the spring-loaded hinge 126 acts to force the transverse battery clamp negative section 124 to form a straight angle, that is, to be in substantially linear alignment, with the transverse battery clamp positive section 122.

The above-described spring-loaded clamp configuration is thus sized and shaped so as to enable a user to place the automotive battery transverse clamp 120 into a state of compression between the battery terminal clamps 36, 38, when the installed transverse battery clamp positive section 122 is linearly aligned with the transverse battery clamp negative section 124. That is, a "contact length" of the flexed spring-loaded automotive battery transverse clamp 120, as measured from inside a concave positive contact face 53 to the inside of a concave negative contact face 55, is slightly greater than the minimum distance between a convex surface of the positive battery terminal clamp 36 and a convex surface of the negative battery terminal clamp 38. This allows for insertion of the flexed automotive battery transverse clamp 120 between the positive battery terminal clamp 36 and the negative battery terminal clamp 38 before substantially linear alignment of the clamp sections 122, 124.

Figure 11:
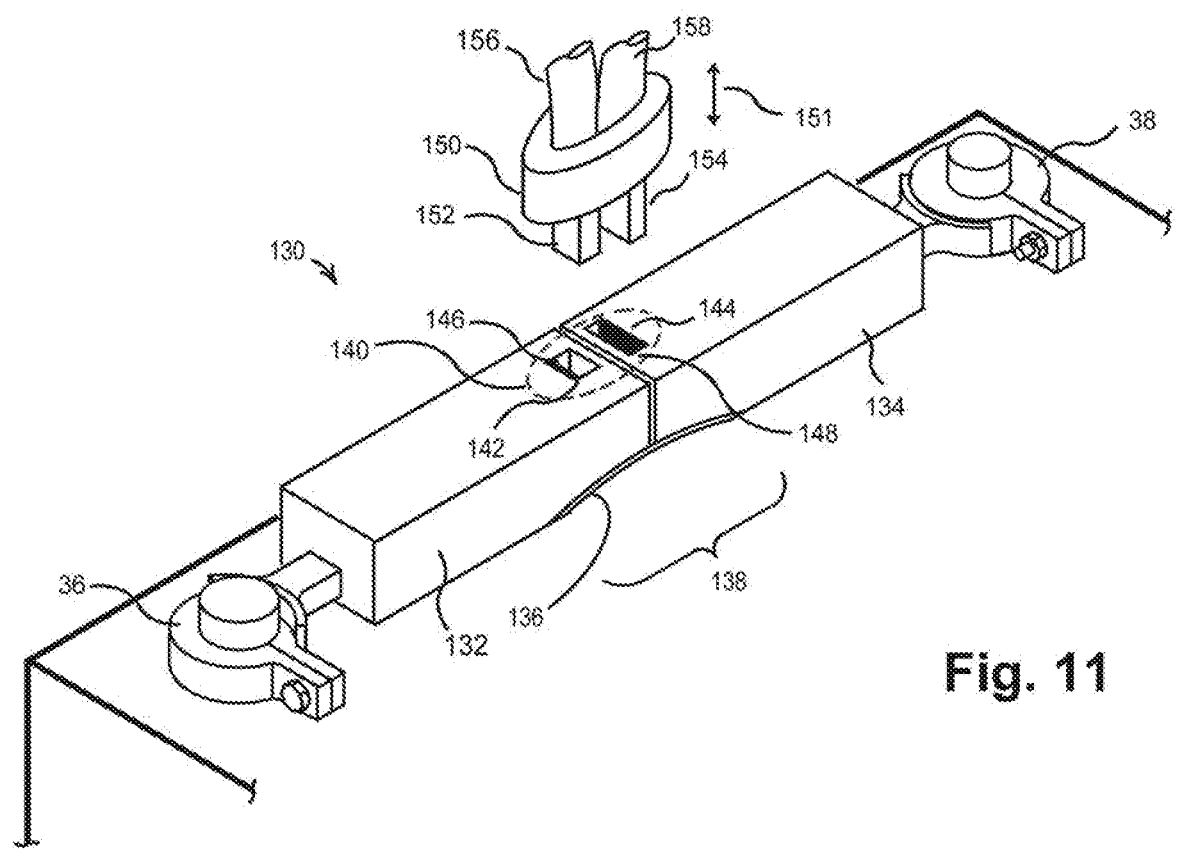
FIG. 11 is an isometric diagrammatical view of the hinged automotive battery transverse clamp of FIG. 10 installed on an automotive battery.

The contact length of the spring-loaded automotive battery transverse clamp 120 is at a maximum when the automotive battery transverse clamp 120 is in a non-flexed state. This non-flexed state forces the terminal contacts 52, 54 against the respective battery terminal clamps 36, 38, similar to the non-flexed state shown for a hinged automotive battery transverse clamp 130 in FIG. 11. In the illustration provided, a flexible web 136 in a concave section 138 of the hinged automotive battery transverse clamp 130 functions as a hinge to connect a transverse battery clamp positive section 132 to a transverse battery clamp negative section 134. The flexible web 136 hinge also enables the transverse battery clamp positive section 132 to rotate with respect to the transverse battery clamp negative section 134 during a flexing operation.

When the transverse battery clamp positive section 132 is linearly aligned with the transverse battery clamp negative section 134, the positive electrical contact opening 142, the positive conductive pad 146, the negative electrical contact opening 144, and the negative conductive pad 148, form a virtual electrical booster receptacle 140 suitable for mating with an electrical booster plug 150. The electrical booster plug 150 includes a positive insulated conductor 156 terminating in a positive electrical prong 152, and a negative insulated conductor 158 terminating in a negative electrical prong 154. The insulated conductors 156, 158 provide charging power from an external source of electricity, such as a remote automotive battery (not shown). Moreover, insertion of the electrical booster plug 150 into the virtual electrical booster receptacle 140 secures the transverse battery clamp positive section 132 in linear alignment with the transverse battery clamp negative section 134. It should be noted that the virtual electrical booster receptacle 140 is also formed when the installed transverse battery clamp positive section 122 is linearly aligned with the transverse battery clamp negative section 124, in FIG. 10. The electrical booster plug 150 can then be mated with the virtual electrical booster receptacle 140 in the spring-loaded automotive battery transverse clamp 120 (not shown).

Figure 12:
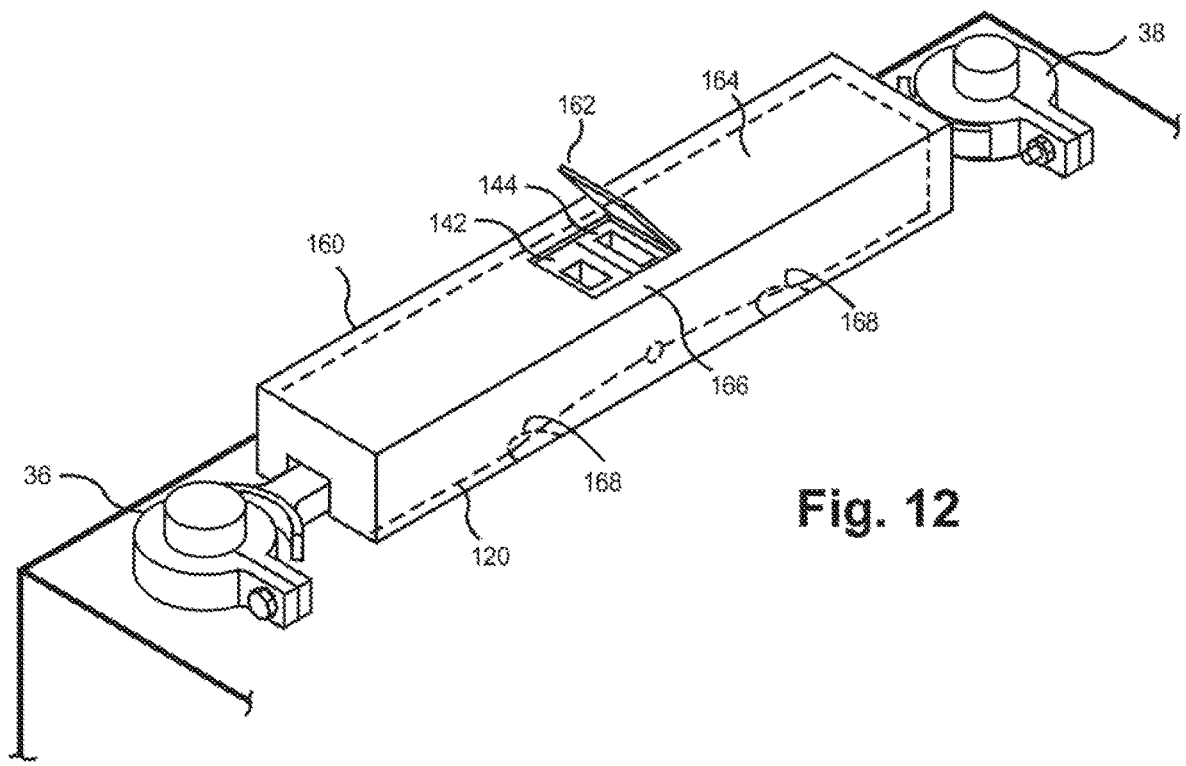
FIG. 12 is an isometric diagrammatical view of a protective cover with a hinged door emplaced over the hinged automotive battery transverse clamp of FIG. 11.

In an exemplary embodiment, shown in FIG. 12, a protective cover 160 may be placed over the spring-loaded automotive battery transverse clamp 120 to mitigate the collection of dust and moisture. A hinged closure 162 may be provided in an outer surface 164 of the protective cover 160 to allow access to the electrical contact openings 142, 144 through a socket access window 166 without the need to remove the protective cover 160. As can be appreciated by one skilled in the relevant art, the hinged closure is opened when an electrical plug is to be inserted, such as the electrical booster plug 150 of FIG. 11. When the electrical booster plug 150 is withdrawn, the hinged closure 162 can be closed over the socket access window 166.

Preferably, the protective cover 160 is retained on the spring-loaded automotive battery transverse clamp 120 by means of a detent feature. For example, the protective cover 160 may include flexible inwardly-projecting tabs 168 that extend under the spring-loaded automotive battery transverse clamp 120. The protective cover 160 can then be removed by flexing the outer surface 164 so as to cause the inwardly-projecting tabs 168 to move away from the spring-loaded automotive battery transverse clamp 120, and pulling upward. Note that the protective cover 160 may extend from the positive battery terminal clamp 36 to the negative battery terminal clamp 38.

Figure 13:
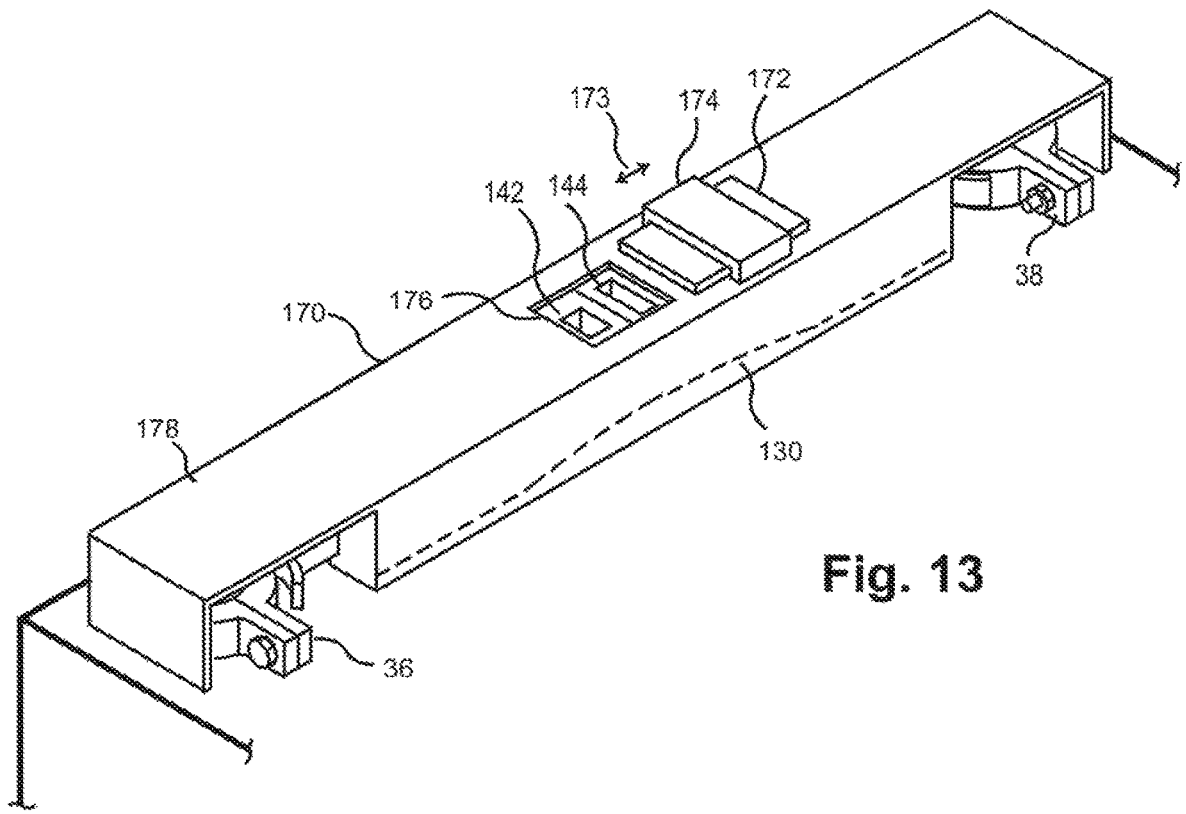
FIG. 13 is an isometric diagrammatical view of a protective cover with a sliding door emplaced over the hinged automotive battery transverse clamp of FIG. 11.

In an alternate embodiment, a protective cover 170 may be used for environmentally shielding the hinged automotive battery transverse clamp 130, as shown in FIG. 13. The protective cover 170 may include a sliding closure 172 and a closure guide 174 configured to selectively cover a socket access window 176 in an outer surface 178 of the protective cover 170. The sliding closure 172 functions to keep dust and moisture from the electrical contact openings 142, 144 when closed, while allowing access for an electrical booster plug, when opened, as indicated by arrow 173. Note that the protective cover 170 is of sufficient length to overlie the positive battery terminal clamp 36 and the negative battery terminal clamp 38.

Figure 14:
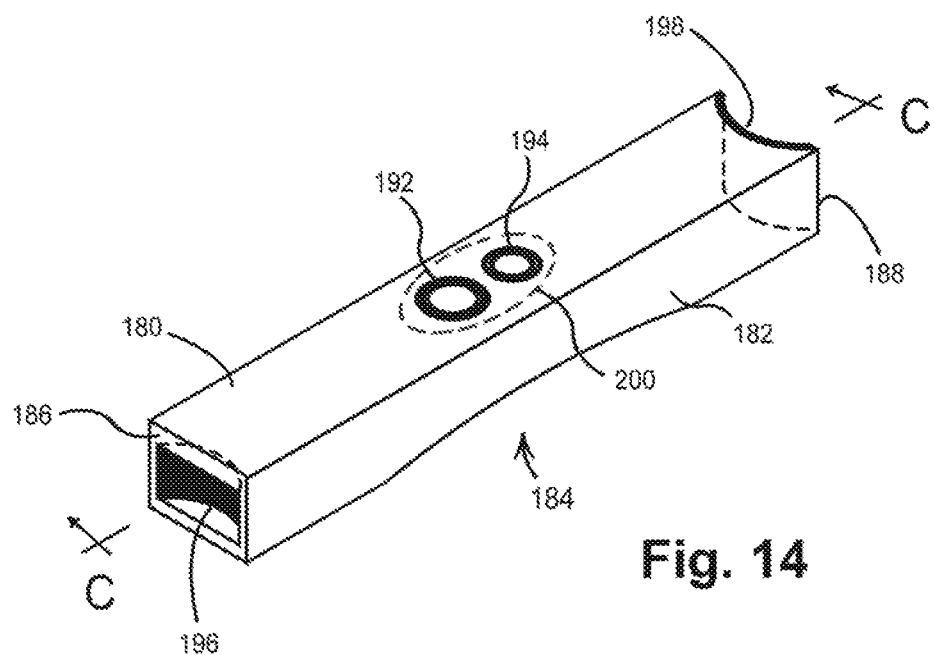
FIG. 14 is an isometric diagrammatical view of an automotive battery transverse clamp having a clamp housing fabricated from a semi-rigid material, in accordance with an aspect of the present invention.

In an exemplary embodiment, shown in FIG. 14, a semi-rigid automotive battery transverse clamp 180 comprises a transverse clamp housing 182 fabricated from a semi-rigid material, such as a hard rubber or a flexible plastic material. The semi-rigid automotive battery transverse clamp 180 can be slightly flexed, and then installed between the battery terminal clamps 36, 38 (see FIGS. 16, 17) under a state of compression. This compressive state functions to retain the semi-rigid automotive battery transverse clamp 180 in place, and to maintain an optimal electrical contact force against the battery terminal clamps 36, 38.

Figure 15:
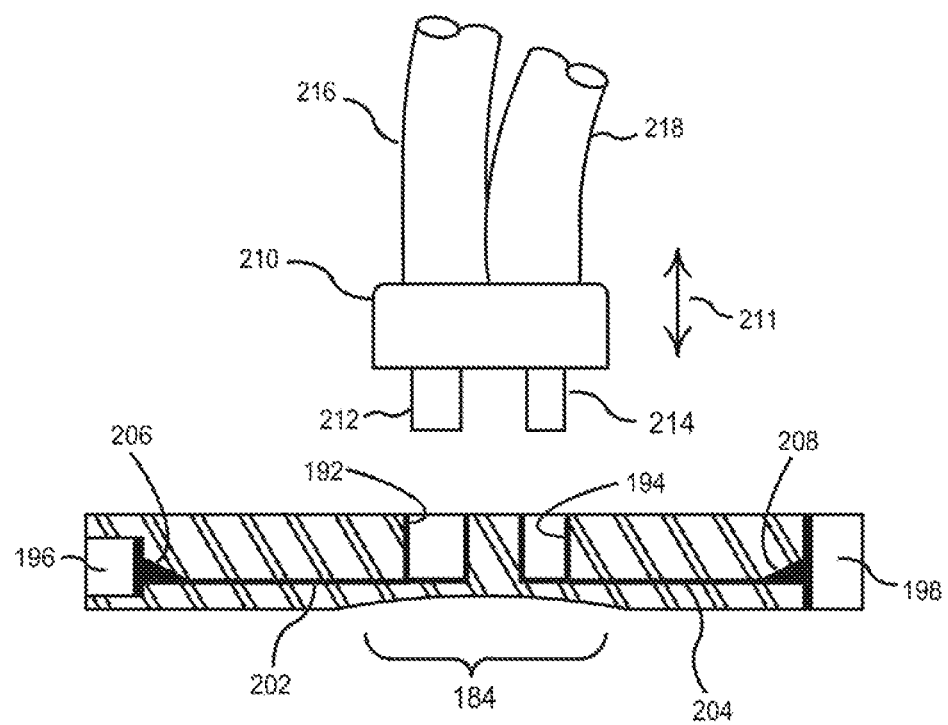
FIG. 15 is a is a cross-sectional view of the semi-rigid automotive battery transverse clamp of FIG. 14.

The transverse clamp housing 182, shown in FIGS. 14 and 15, includes a recessed section 184 so as to provide for grasping the semi-rigid automotive battery transverse clamp 180 when installing onto, or removing from, the automotive battery 20 (not shown). The transverse clamp housing 182 includes an electrically conductive positive cylindrical contact 192 and an electrically conductive negative cylindrical contact 194. In an exemplary embodiment, the electrically conductive cylindrical contacts 192, 194 are circular in cross section and may be fabricated from a copper alloy or other metallic material or another electrically conductive material.

The electrically conductive cylindrical contacts 192, 194 are spaced apart a predetermined distance so as to form an electrical booster receptacle 200. A positive terminal arcuate contact 196 is provided at a first end 186 of the transverse clamp housing 182, and a negative terminal arcuate contact 198 is provided at a second opposed end 188. The terminal arcuate contacts 196, 198 may be fabricated from a copper alloy or other electrically conductive material.

As best seen in the cross-sectional view C-C of FIG. 15, a positive conductive line 202 and a positive contact support 206 are electrically connecting the positive terminal arcuate contact 196 with the positive contact sleeve 192. Similarly, a negative conductive line 204 and a negative contact support 208 are electrically connecting the negative terminal arcuate contact 198 with the negative contact sleeve 194. The contact supports 206, 208 provide a transition from the cross-sectional geometry of the conductive lines 202, 204 to the geometrical configuration of the respective terminal arcuate contacts 196, 198. The conductive lines 202, 204 and the contact supports 206, 208 are similarly fabricated from a copper alloy or other electrically conductive material.

The contact supports 206, 208 are sized and configured at one end to form optimized electrical connections with the respective terminal arcuate contacts 196, 198. The contact supports 206, 208 are also sized and configured at the other end to form optimized electrical connections with the respective conductive lines 202, 204. This sizing and configuration serves to prevent mechanical separation of the conductive lines 202, 204 from the respective terminal arcuate contacts 196, 198 as a consequence of repeated user handling and installation of the semi-rigid automotive battery transverse clamp 180.

An electrical booster plug 210 is configured to mate with the electrical booster receptacle 200, as indicated by arrow 211. In particular, the electrical booster plug 210 includes a positive insulated conductor 216 terminating in a positive electrical prong 212, and a negative insulated conductor 218 terminating in a negative electrical prong 214. The electrical prongs 212, 214 are sized and shaped for insertion into the respective conductive cylindrical contacts 192, 194.

Figure 16:
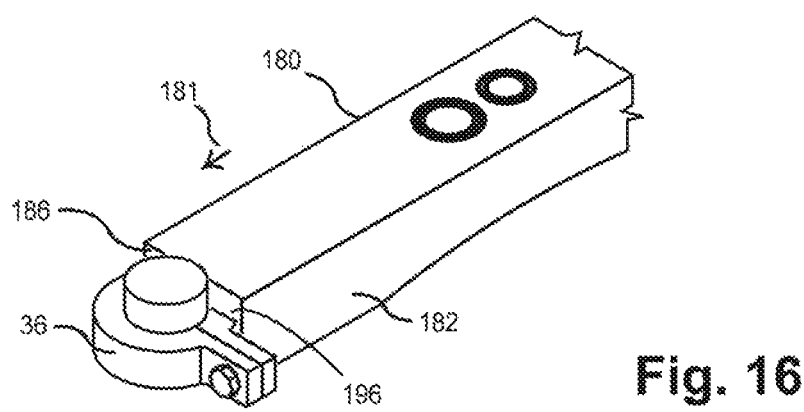
FIG. 16 is an isometric diagrammatical view of an initial step in installation of the semi-rigid automotive battery transverse clamp of FIG. 14 onto an automotive battery.
Figure 17:
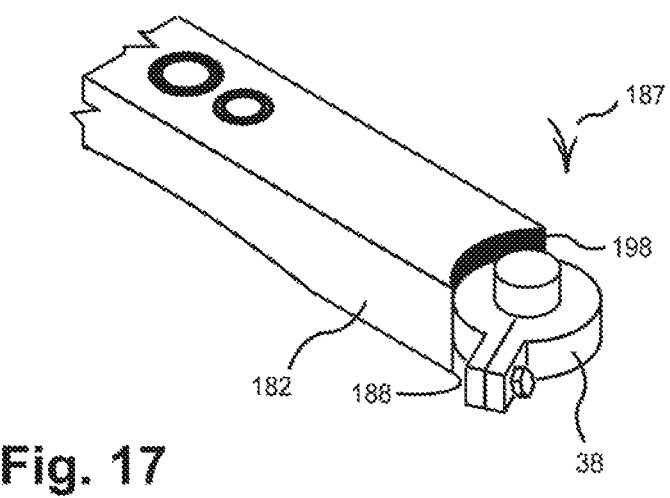
FIG. 17 is an isometric diagrammatical view of a subsequent step in installation of the semi-rigid automotive battery transverse clamp of FIG. 14 onto an automotive battery.

Installation of the semi-rigid automotive battery transverse clamp 180 can be explained with reference to FIG. 16 in which the first end 186 of the transverse clamp housing 182 is fitted over part of the positive terminal battery clamp 36, as indicated by arrow 181. The semi-rigid automotive battery transverse clamp 180 is forced against the positive terminal battery clamp 36 such that the positive terminal battery clamp 36 makes electrical contact with the positive terminal arcuate contact 196. The second opposed end 188 of the transverse clamp housing 182 is placed against the negative terminal battery clamp 38, as indicated by arrow 187 in FIG. 17 such that the negative terminal arcuate contact 198 makes electrical contact with the negative terminal battery clamp 38. It should be understood that the recessed configuration of the positive terminal arcuate contact 196 can be used at both ends of the semi-rigid automotive battery transverse clamp 180. Alternatively, the open configuration of the negative terminal arcuate contact 198 can be used at both ends of the semi-rigid automotive battery transverse clamp 180.

It should also be understood that any one of the electrical booster receptacle 60, 140, 200 configurations can be used on any one of the automotive battery transverse clamp 40, 80, 100, 120, 130, 180 configurations described above. As the existing population of post terminal automotive car batteries are retrofitted with any of the disclosed automotive battery transverse clamps 40, 80, 100, 120, 130, 180, the conventional booster clamp 10 will find fewer applications and may eventually be relegated to non-automotive applications. But wait, there's more.

Figure 18:
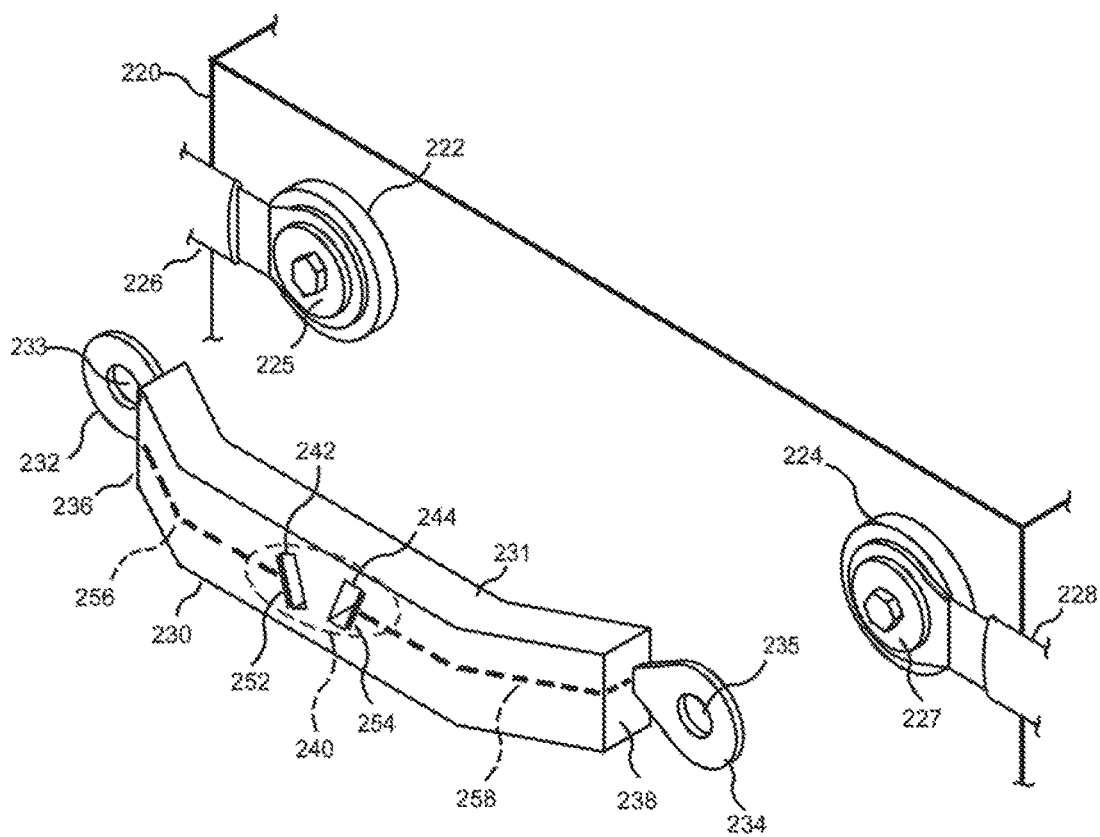
FIG. 18 is an isometric diagrammatical view of an automotive battery side mount clamp having annular lug contacts, in accordance with an aspect of the present invention.

There is shown in FIG. 18 an automotive battery side mount clamp 230 configured for attachment to a side terminal automotive battery 220. The side terminal automotive battery 220 includes a positive battery side terminal 222 and a negative battery side terminal 224 as shown. When secured in an engine compartment, a first cable fastener 225 is used to electrically connect an automotive battery power cable 226 to the positive battery side terminal 222, and a second cable fastener 227 is used to electrically connect an automotive battery ground cable 228 to the negative battery side terminal 224.

The automotive battery side mount clamp 230 includes a positive terminal annular lug 232 and a negative terminal annular lug 234 extending from respective opposing ends 236, 238 of a side mount clamp housing 231. The terminal annular lugs 232, 234 have respective central openings 233, 235 which allow for insertion of the cable fasteners 225, 227 as described below. The side mount clamp housing 231 includes a substantially rectangular positive electrical contact opening 242 disposed proximate a substantially rectangular negative electrical contact opening 244. Note that the positive electrical contact opening 242 is longer and narrower than the negative electrical contact opening 244, so as to provide a polarized electrical booster receptacle 240. The electrical contact openings 242, 244 are also angled with respect to one another to aid a user in assuring proper orientation of an electrical booster plug 260, seen in FIG. 19.

A positive contact pad 252, in FIG. 18, is fixed to an inside surface of the positive electrical contact opening 242, and a negative contact pad 254 is fixed to an inside surface of the negative electrical contact opening 244. The positive terminal annular lug 232 is electrically connected to the positive contact pad 252 by means of a positive conductive line 256 routed inside the side mount clamp housing 231. Likewise, the negative terminal lug 24 is electrically connected to the negative conductive pad 254 by means of a negative conductive line 258, also routed inside the side mount clamp housing 231. In an exemplary embodiment, the terminal annular lugs 232, 234, the conductive lines 256, 258, and the contact pads 252, 254 are fabricated from a copper alloy or other electrically-conductive material.

Figure 19:
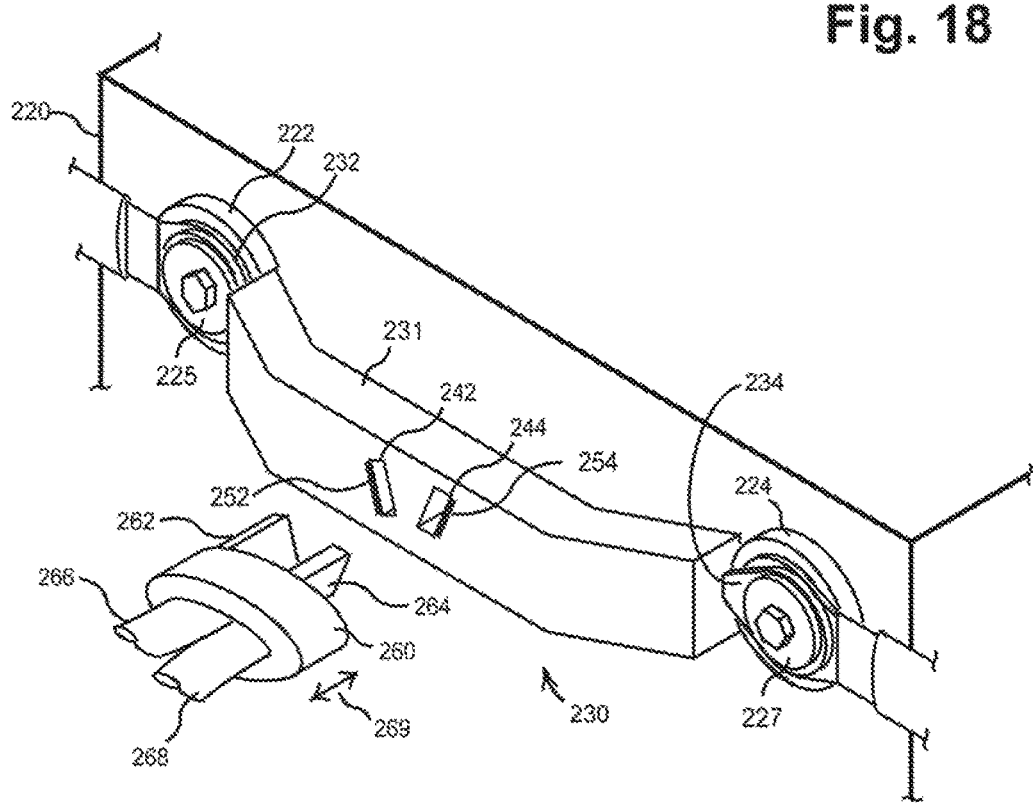
FIG. 19 is an isometric diagrammatical view of the automotive battery side mount clamp of FIG. 18 installed on a side mount terminal automotive battery.

FIG. 19 shows the automotive battery side mount clamp 230 installed on the side terminal automotive battery 220, in accordance with an aspect of the present invention. Note that the first cable fastener 225 is securing the positive terminal annular lug 232 against the positive battery side terminal 222, and the second cable fastener 227 is securing the negative terminal annular lug 234 against the negative battery side terminal 224. With the installation of the automotive battery side mount clamp 230, as shown in the illustration, the electrical booster plug 260 can be inserted into the contact openings 242, 244.

The electrical booster plug 260 includes a positive insulated conductor 266 terminating in a positive electrical prong 262, and a negative insulated conductor 268 terminating in a negative electrical prong 264. The insulated conductors 266, 268 conduct charging power from an external source of electricity (not shown). Insertion of the electrical booster plug 260 into the transverse battery clamp 230, as indicated by arrow 269, places the positive electrical prong 262 into physical and electrical contact with the positive contact pad 252, and places the negative electrical prong 264 into physical and electrical contact with the negative contact pad 254.

This act of insertion further provides: (i) a positive electrical path from the external source of electricity via the positive insulated conductor 266, through the positive electrical prong 262, to the positive contact pad 252, through the positive conductive line 256, to the positive battery side terminal 222; and (ii) a negative electrical path from the external source of electricity via the negative insulated conductor 268, through the negative electrical prong 264, to the negative contact pad 254, through the negative conductive line 258, and to the negative battery side terminal 224.

In an exemplary embodiment, the positive conductive line 256, shown in FIG. 18, may be connected to two or more positive conductive pads (not shown) attached to two, three, or all four inside surfaces of the positive electrical contact opening 242. This configuration provides a greater contact surface area to minimize a voltage drop across the mating interface between the two or more positive conductive pads in electrical contact with the positive electrical prong 262. Similarly, the negative conductive line 258 may be connected to two or more negative conductive pads (not shown) attached to two, three, or all four inside surfaces of the negative electrical contact opening 244.

Figure 20:
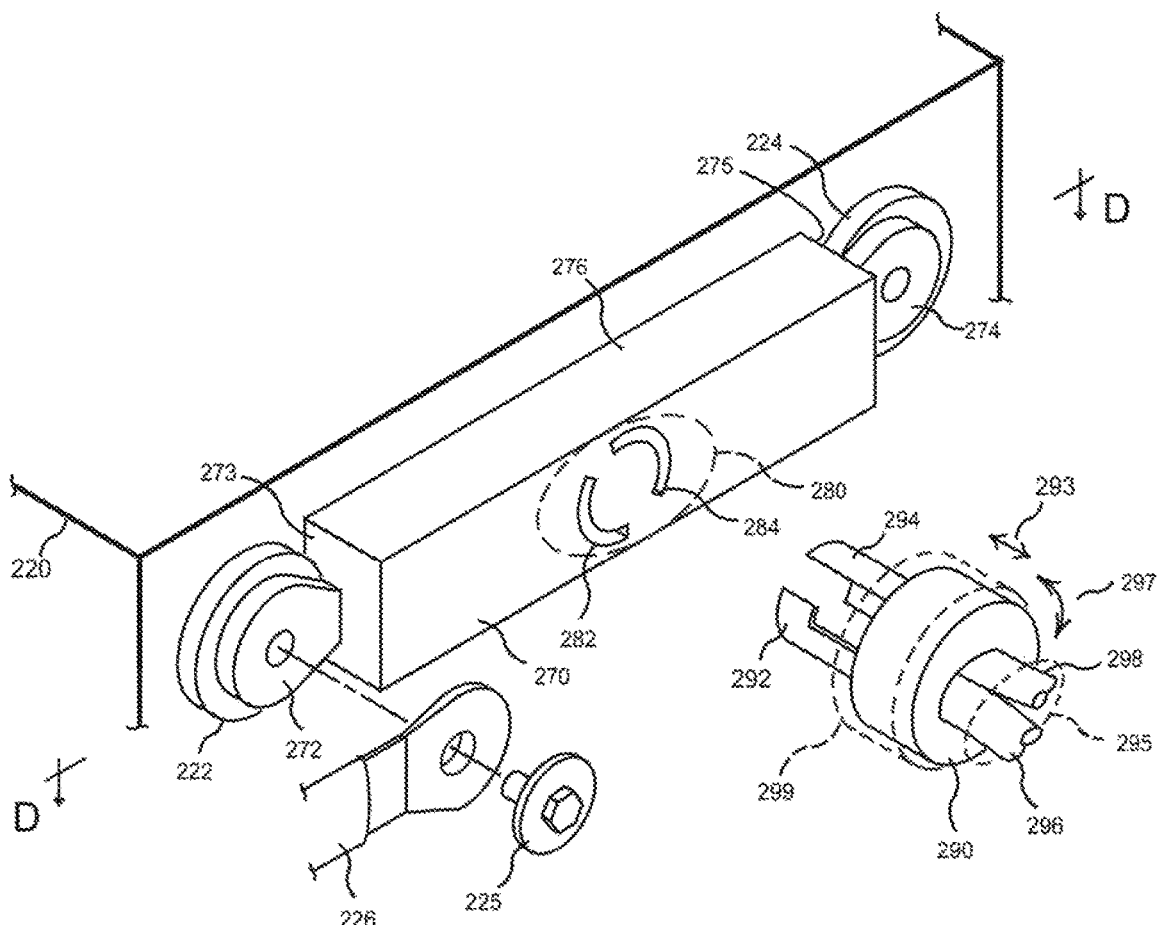
FIG. 20 is an isometric diagrammatical view of an automotive battery side mount clamp having electrical arcuate contact openings, in accordance with an aspect of the present invention.

In an exemplary embodiment, an automotive battery side mount clamp 270 is attached to the side terminal automotive battery 220, as shown in FIG. 20. The automotive battery side mount clamp 270 includes a positive terminal annular lug 272 extending from a first end 273 of a side mount clamp housing 276, and a negative terminal annular lug 274 extending from a second, opposed end 275 of the side mount clamp housing 276. The first cable fastener 225 is used to secure the automotive battery power cable 226 and the positive terminal annular lug 272 against the positive battery side terminal 222. The negative terminal annular lug 274 and the automotive battery ground cable 228 (not shown) are similarly held against the negative battery side terminal 224 by means of the second cable fastener 227 (not shown).

The side mount clamp housing 276 also includes a positive electrical arcuate contact opening 282 and a negative electrical arcuate contact opening 284 forming an electrical booster receptacle 280. In an exemplary embodiment, the positive electrical arcuate contact opening 282 and the negative electrical arcuate contact opening 284 are of unequal arc lengths so as to provide a polarized electrical booster receptacle 280 for an electrical booster plug 290.

The electrical booster plug 290 includes an arcuate positive electrical prong 292 and an arcuate negative electrical prong 294 configured to mate with respective electrical arcuate contact openings 282, 284. A positive insulated conductor 296 is connected to the positive electrical prong 292, and a negative insulated conductor 298 is connected to the negative electrical prong 294. The positive insulated conductor 296 and the negative insulated conductor 298 form an electrical cable pair 295, such as used in a conventional booster cable.

Mating of the electrical booster plug 290 with the electrical booster receptacle 280 requires an initial insertion, as indicated by the arrow 293, and then a rotation, as indicated by the arrow 297. A sliding plug cover 299, shown in phantom, may be included on the electrical booster plug 290 to enclose the electrical prongs 292, 294 as a means of preventing an electrical short across the electrical prongs 292, 294 if the electrical booster plug 290 were to be accidentally dropped into an automobile engine compartment. It can be appreciated that a plug cover similar to the plug cover 299 can be adapted for use on any of the electrical booster plugs 70, 150, 210, 250, 340, and 390 disclosed herein.

Figure 21:
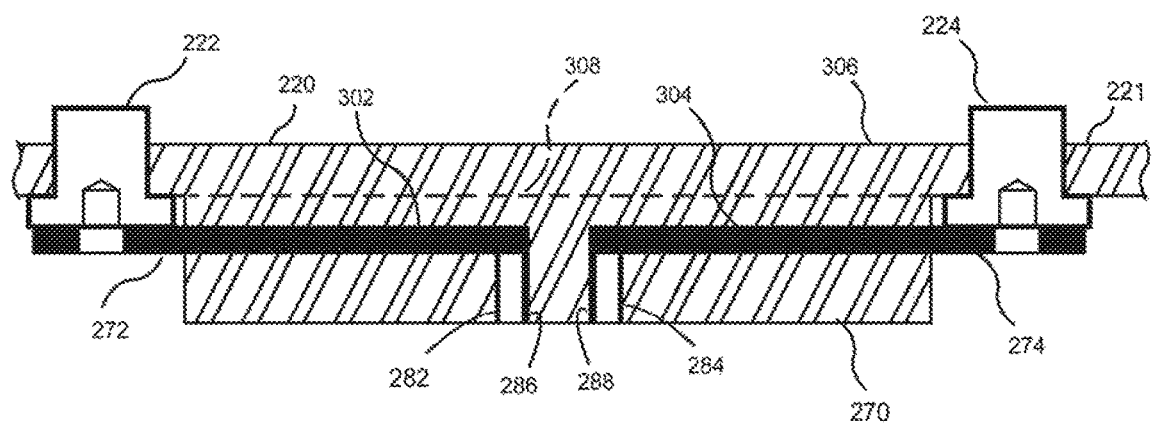
FIG. 21 is cross-sectional view of the automotive battery side mount clamp of FIG. 20.

FIG. 21 is a cross-sectional view D-D of the automotive battery side mount clamp 270. It can be seen that a positive contact pad 286 is attached to an inside surface of the positive electrical arcuate contact opening 282, and that a negative contact pad 288 is attached to an inside surface of the negative electrical arcuate contact opening 284. A positive conductive line 302 provides an electrical connection between the positive terminal annular lug 272 and the positive contact pad 286. A negative conductive line 304 provides an electrical connection between the negative terminal annular lug 274 and the negative contact pad 288. The conductive lines 302, 304, the terminal annular lugs 272, 274, and the contact pads 286, 288 may be fabricated from a copper alloy, for example, or any electrically conductive material.

The automotive battery side mount clamp 270 is positioned against a case wall 221 of the side terminal automotive battery 220. In an exemplary embodiment, the automotive battery side mount clamp 270 may be bonded to the case wall 221, as indicated by a bond interface 308. In an alternative embodiment, the automotive battery side mount clamp 270 may be fabricated or formed as a unit with the side terminal automotive battery 220, as the material forming the 276 can be the same flexible, plastic-based material from which the case wall 221 of the side terminal automotive battery is produced.

Figure 22:
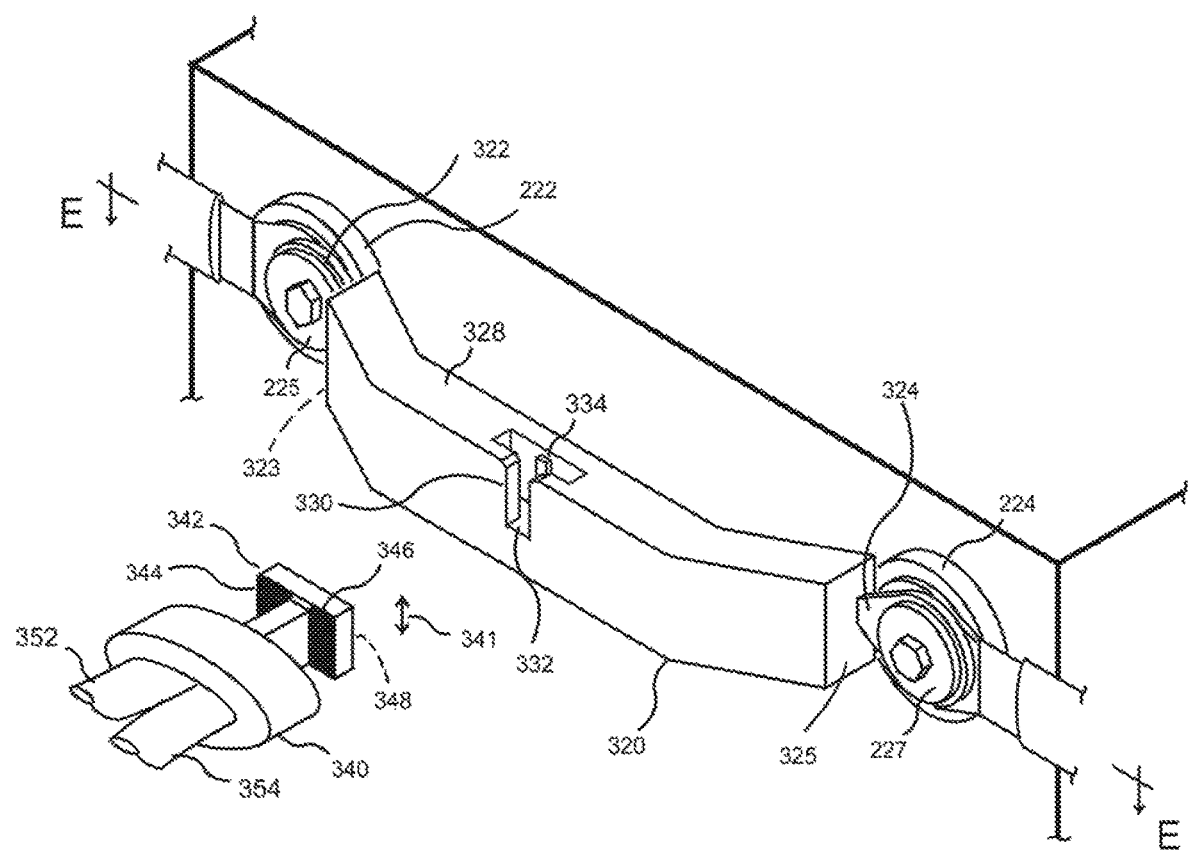
FIG. 22 is an isometric diagrammatical view of an automotive battery side mount clamp having an electrical booster tee slot receptacle, in accordance with an aspect of the present invention.

There is shown in FIG. 22 an automotive battery side mount clamp 320. The automotive battery side mount clamp 320 includes a side mount clamp housing 328 having a positive terminal annular lug 322 extending from a first clamp housing end 323, and a negative terminal annular lug 324 extending from a second clamp housing end 325. Upon attachment of the automotive battery side mount clamp 320 to the side terminal automotive battery 220, a first cable fastener 225 may be used to secure the positive terminal annular lug 322 against the positive battery side terminal 222, and a second cable fastener 227 may be used to secure the negative terminal annular lug 324 against the negative battery side terminal 224.

The automotive battery side mount clamp 320 is configured to electrically mate with an electrical booster plug 340 using a sliding motion, indicated by arrow 341. The side mount clamp housing 328 includes an electrical booster receptacle 330 having a tee slot 332 and a guide ridge 334. The guide ridge 334 restricts mating with the electrical booster plug 340 such that proper orientation of the electrical booster plug 340 is maintained. The guide ridge 334 thus provides for a polarized electrical connector configuration.

The tee slot 332 is adapted to receive a tee insertion tab 342 of the electrical booster plug 340. The tee insertion tab 342 includes a positive plug contact pad 344 and a negative plug contact pad 346 located on inner surfaces of the tee insertion tab 342. This configuration prevents electrical shorting if the electrical booster plug were to be dropped onto a metal surface. A positive insulated conductor 352 is electrically connected to the positive plug contact pad 344, and a negative insulated conductor 354 is electrically connected to the negative plug contact pad 346. The plug contact pads 344, 346 and the insulated conductors 352, 354 are fabricated from a copper alloy or other electrically-conductive material, and are sized and shaped to safely conduct the electrical current required for jump starting an automobile, for example.

Figure 23:
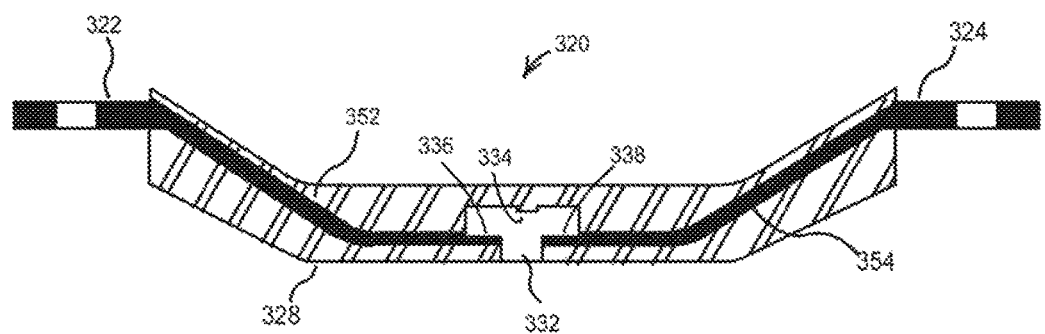
FIG. 23 is cross-sectional view of the automotive battery side mount clamp of FIG. 22.

FIG. 23 is a cross-sectional view E-E of the automotive battery side mount clamp 320 showing the locations of the guide ridge 334, a positive plug contact pad 336, and a negative plug contact pad 338 in the tee slot 332. A positive conductive line 352 electrically connects the positive terminal annular lug 322 to the positive receptacle contact pad 336, and a negative conductive line 354 electrically connects the negative terminal annular lug 324 to the negative receptacle contact pad 338. The receptacle contact pads 336, 338, the conductive lines 352, 354, and the terminal annular lugs 322, 324 are fabricated from a copper alloy or other electrically conductive material, and are sized and shaped to safely conduct the electrical current required for jump starting an external battery, for example.

As can be seen with additional reference to FIG. 23, when the electrical booster plug 340 is properly inserted into the tee slot 332, the positive receptacle contact pad 336 is placed into electrical contact with the positive plug contact pad 344, and the negative receptacle contact pad 338 is placed into electrical contact with the negative plug contact pad 346. The downward insertion of the electrical booster plug 340 into the electrical booster receptacle 330 enables charging current to flow from a remote source of electricity (not shown) through the electrical booster plug 340, through the automotive battery side mount clamp 320, and to the battery side terminals 222, 224.

Figure 24:
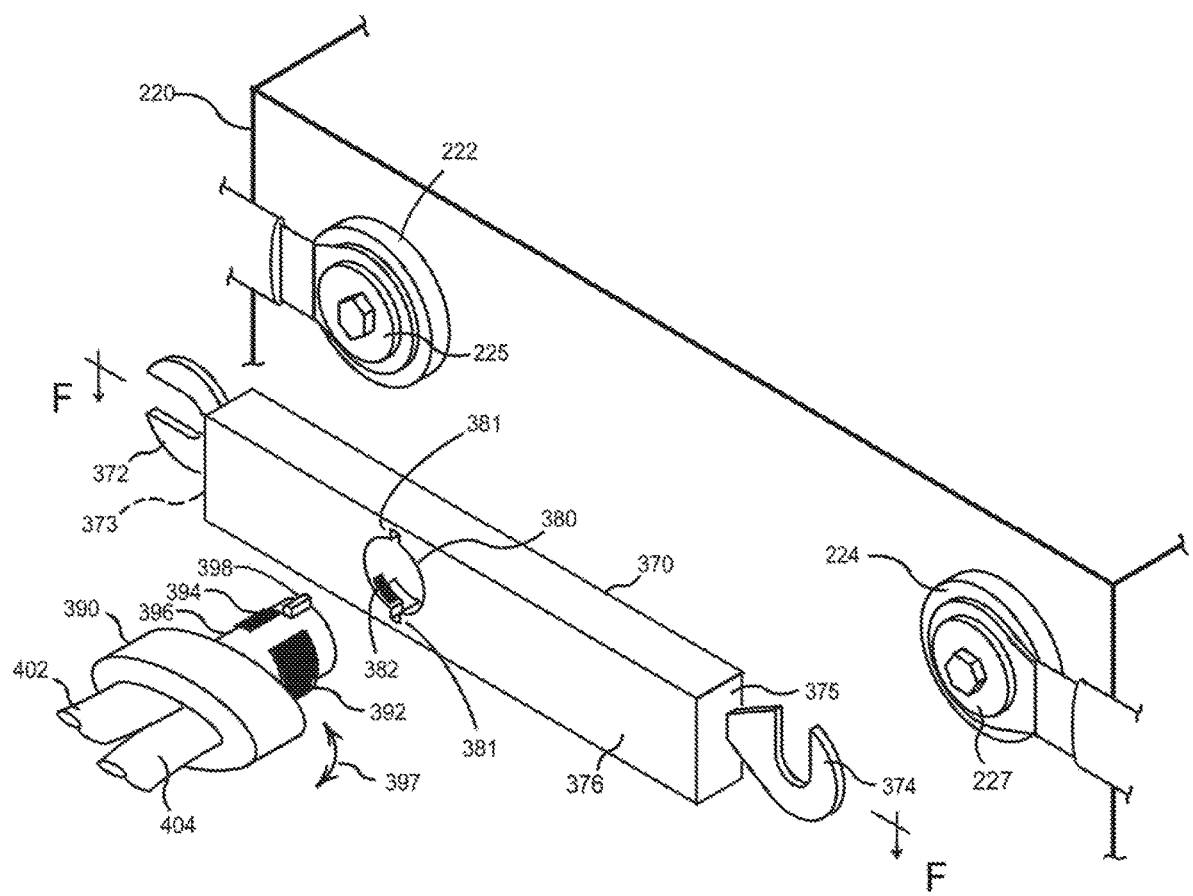
FIG. 24 is an isometric diagrammatical view of an automotive battery side mount clamp having a cylindrical socket receptacle, in accordance with an aspect of the present invention.

In an exemplary embodiment, shown in FIG. 24, an automotive battery side mount clamp 370 includes a cylindrical receptacle socket 380 in a side mount clamp housing 376, with a keyway 381 and a positive receptacle contact pad 382. There is a positive terminal spade lug 372 extending from a first clamp housing end 373 and a negative terminal spade lug 374 extending from a second, opposed clamp housing end 375 of the side mount clamp housing 376. The terminal spade lugs 372, 374 have open ends to allow for insertion under the cable fasteners 225, 227 so that the cable fasteners 225, 227 need not be completely removed from the battery side terminals 222, 224 to allow for installation of the automotive battery side mount clamp 370.

In the particular embodiment shown, the open end on the positive terminal spade lug 372 faces away from the side mount clamp housing 376, and the open end on the negative terminal spade lug 374 is at an angle to the long dimension of the side mount clamp housing 376. It should be understood that the automotive battery side mount clamp 370 can be alternatively configured with both terminal lugs having open ends facing away from the side mount clamp housing 376, or with both terminal lugs having open ends at angles to the long dimension of the side mount clamp housing 376.

An electrical booster plug 390 includes a cylindrical insert 396 with a positive plug contact pad 392 and a negative plug contact pad 394. The cylindrical insert 396 may include a guide tab 398 to insure proper polarity prior to insertion into the cylindrical receptacle socket 380. A positive insulated conductor 402 is electrically connected to the positive plug contact pad 392, and a negative insulated conductor 404 is electrically connected to the negative plug contact pad 394.

Figure 25:
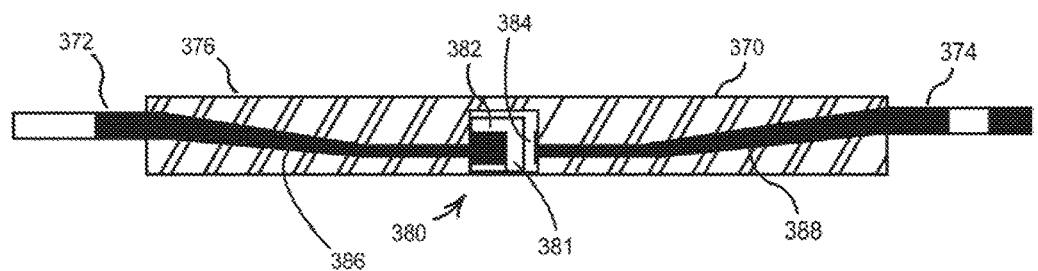
FIG. 25 is a is cross-sectional view of the automotive battery side mount clamp of FIG. 24.

As seen with additional reference to the cross sectional view F-F of the automotive battery side mount clamp 370 in FIG. 25, the cylindrical receptacle socket 380 includes the positive receptacle contact pad 382 and a negative receptacle contact pad 384 disposed on an inside surface of the cylindrical receptacle socket 380. A positive conductive line 386 in the side mount clamp housing 376 connects the positive receptacle contact pad 382 with the positive terminal lug 372, and a negative conductive line 388 connects the negative receptacle contact pad 384 with the negative terminal lug 374. The keyway 381 in the cylindrical receptacle socket 380 conforms to the shape and size of the guide tab 398 to insure proper orientation of the electrical booster plug 390 with the cylindrical receptacle socket 380 and provide for a polarized electrical connection.

When the electrical booster plug 390 is inserted into the circular receptacle socket 380 and rotated, the positive plug contact pad 392 on the cylindrical insert 396 makes electrical contact with the positive receptacle contact pad 382 in the cylindrical receptacle socket 380. At the same time, the negative plug contact pad 394 on the cylindrical insert 396 makes electrical contact with the negative receptacle contact pad 384.

With the electrical booster plug 390 inserted into the cylindrical receptacle socket 380, the positive conductive line 386 completes an electrical path from the positive battery side terminal 222, through the positive terminal lug 372, through the positive conductive line 386, through the positive receptacle contact pad 382, through the positive plug contact pad 394, and to the positive insulated conductor 402. Similarly, the negative conductive line 388 completes an electrical path from the negative battery side terminal 224, through the negative terminal lug 374, through the negative conductive line 388, through the negative receptacle contact pad 384, through the negative plug contact pad 394, and to the negative insulated conductor 404.

Figure 26:
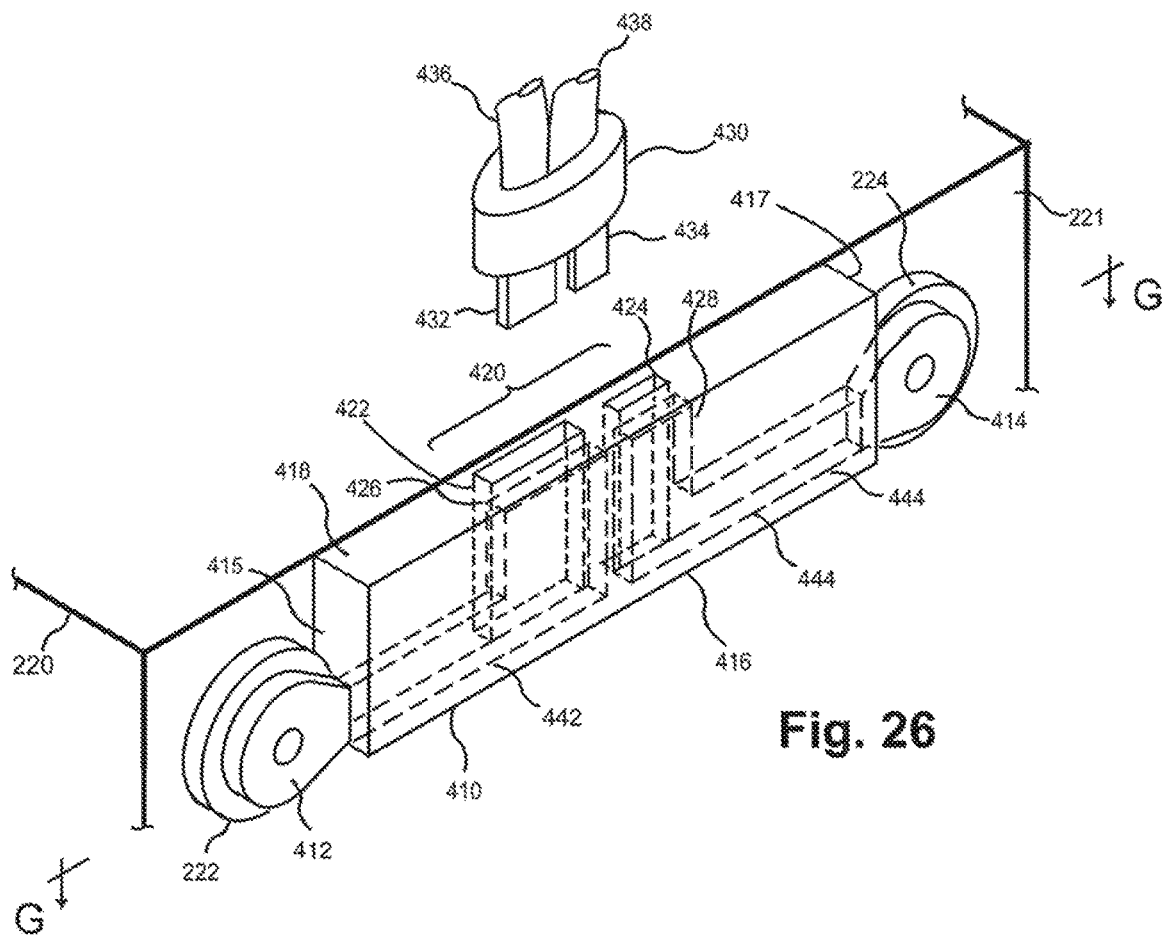
FIG. 26 is an isometric diagrammatical view of a narrow-profile automotive battery side mount clamp having a vertical slotted electrical receptacle, in accordance with an aspect of the present invention.

In an exemplary embodiment, shown in FIG. 26, an automotive battery side mount clamp 410 includes a vertical-slotted booster receptacle 420 in a side mount clamp housing 416. There is a positive terminal annular lug 412 extending from a first clamp housing end 415 and a negative terminal annular lug 414 extending from a second, opposed clamp housing end 417 of the side mount clamp housing 416. The terminal annular lugs 412, 414 are configured for placement against respective battery side terminals 222, 224 as shown in the illustration.

The side mount clamp housing 416 includes a substantially rectangular positive electrical contact opening 422 disposed proximate a substantially rectangular negative electrical contact opening 424. A positive contact pad 426 is secured in the positive electrical contact opening 422, and a negative contact pad 428 is secured in the negative electrical contact opening 424. Note that the positive electrical contact opening 422 is dimensionally different from the negative electrical contact opening 424, so as to provide a polarized feature. As seen in the illustration, a side of the positive electrical contact opening 422 is substantially collinear with a side of the negative electrical contact opening 424. This narrow configuration allows for placement of the vertical-slotted booster receptacle 420 in a clamp housing top surface 418 and enables insertion of an electrical booster plug 430 using a vertical motion.

The electrical booster plug 430 includes a positive insulated conductor 436 terminating in a positive electrical prong 432, and a negative insulated conductor 438 terminating in a negative electrical prong 434. The insulated conductors 436, 438 conduct charging power from an external source of direct current electricity (not shown). Insertion of the electrical booster plug 430 into the automotive battery side mount clamp 410 places the positive electrical prong 432 into physical and electrical contact with the positive contact pad 426, and places the negative electrical prong 434 into physical and electrical contact with the negative contact pad 428.

Figure 27:
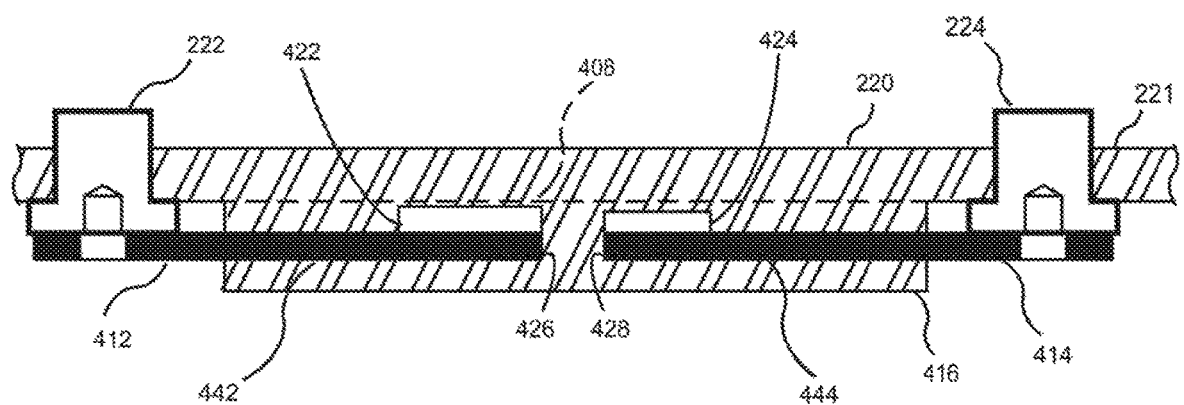
FIG. 27 is a is cross-sectional view of the automotive battery side mount clamp of FIG. 26.

As seen with additional reference to the cross sectional view G-G in FIG. 27, the automotive battery side mount clamp 410 includes (i) a positive conductive line 442 electrically connecting the positive terminal annular lug 412 on the positive battery side terminal 222 to the positive contact pad 426 in the positive electrical contact opening 422, and (ii) a negative conductive line 444 electrically connecting the negative terminal annular lug 414 to the negative contact pad 428 in the negative electrical contact opening 424.

The terminal annular lugs 412, 414, the conductive lines 442, 444, and the contact pads 426, 428 may be fabricated from an electrically conductive material, such as a copper alloy or other metal. In an exemplary embodiment, the positive terminal annular lug 412, the positive conductive line 442, and the positive contact pad 426 may be fabricated as a single, unitary, electrically-conductive component. Additionally, the negative terminal annular lug 414, the negative conductive line 444, and the negative contact pad 428 may also be fabricated as a single, unitary, electrically-conductive component.

The side mount clamp housing 416 may optionally be bonded to the case wall 221 of the side terminal automotive battery 220, as indicated by a bond interface 408. In yet another alternative embodiment, the side mount clamp housing 416 may be fabricated or formed as a unit with the side terminal automotive battery 220, as the material forming the side mount clamp housing 416 can be the same flexible, plastic-based material from which the case wall 221 of the side terminal automotive battery 220 is fabricated.

Figure 28:
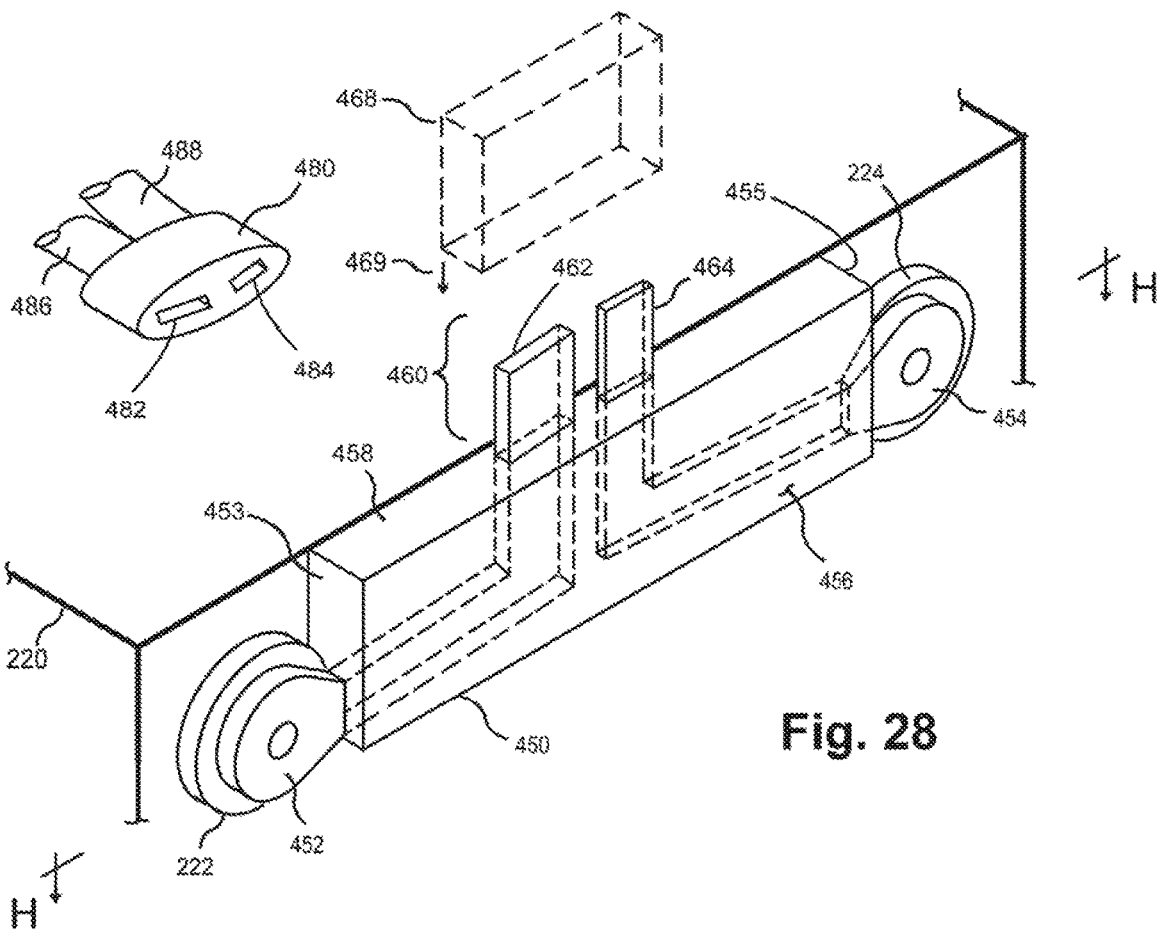
FIG. 28 an isometric diagrammatical view of an automotive battery side mount clamp having an electrical booster plug, in accordance with an aspect of the present invention.

In an alternative configuration, a booster cable system comprises a booster cable with an electrical receptacle, and a battery clamp with an electrical plug. As shown in FIG. 28, an automotive battery side mount clamp 450 includes an electrical booster plug 460 extending from a top surface 458 of a side mount clamp housing 456. The electrical booster plug 460 is configured to electrically mate with an electrical booster receptacle 480. This configuration can be useful for certain automotive battery mounting configurations in which space is at a premium and the above disclosed configurations may not be readily accommodated.

The automotive battery side mount clamp 450 includes a positive terminal annular lug 452 extending from a first clamp housing end 453 and a negative terminal annular lug 454 extending from a second, opposed clamp housing end 455 of the side mount clamp housing 456. The terminal annular lugs 452, 454 are configured for placement against respective battery side terminals 222, 224 of the side terminal automotive battery 220 as shown in the illustration. The side mount clamp housing 456 includes a positive electrical contact prong 462 disposed proximate a negative electrical contact prong 464. Note that the positive electrical contact prong 462 is dimensionally dissimilar from the negative electrical contact prong 464, so as to provide a polarized electrical booster plug 460. As seen in the illustration, the positive electrical contact prong 462 is positioned at an angle to the negative electrical contact prong 464. An optional booster plug cap 468 may be emplaced over the electrical contact prongs 462, 464, as indicated by arrow 469, to prevent inadvertent contact or a shorting situation, and to protect the electrical contact prongs 462, 464 from exposure to dirt, moisture, or bending forces.

The electrical booster receptacle 480 includes a positive insulated conductor 486 terminating in a positive electrically-conductive slot 482, and a negative insulated conductor 488 terminating in a negative electrically-conductive slot 484. The insulated conductors 486, 488 conduct charging power from an external source of direct current electricity (not shown). Insertion of the electrical booster plug 460 into the electrical booster receptacle 480 places the positive electrical prong 462 into physical and electrical contact with the positive electrical slot 482, and places the negative electrical prong 464 into physical and electrical contact with the negative electrical slot 484. This action completes an electrical path from the positive battery side terminal 222 to the positive insulated conductor 486, and from the negative battery side terminal 224 to the negative insulated conductor 488.

Figure 29:
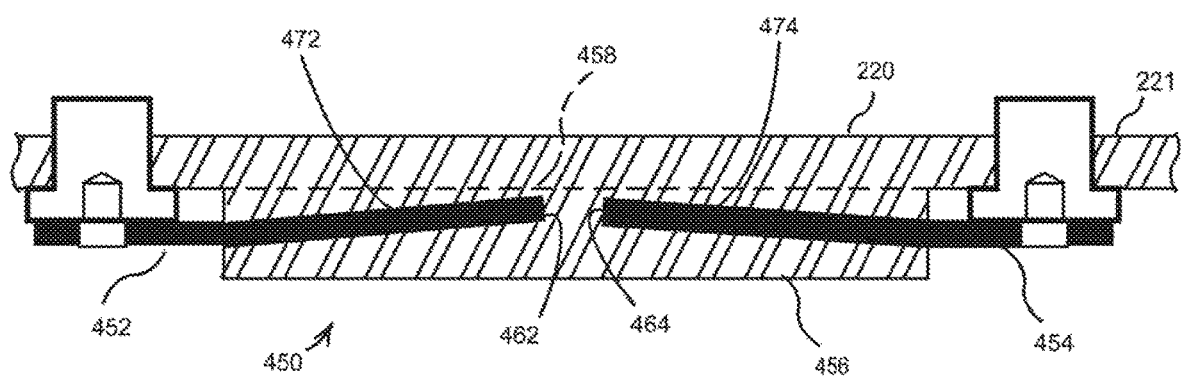
FIG. 29 is a is cross-sectional view of the automotive battery side mount clamp of FIG. 28.

As seen with additional reference to the cross sectional view H-H in FIG. 29, the automotive battery side mount clamp 450 includes a positive conductive line 472 electrically connecting the positive terminal annular lug 452 to the positive electrical prong 462, and a negative conductive line 474 electrically connecting the negative terminal annular lug 454 to the negative electrical prong 464. Both the conductive lines 472, 474 have sufficient cross-sectional areas to safely conduct a charging current used to charge an automotive battery.

The terminal annular lugs 452, 454, the conductive lines 472, 474, the electrical prongs 462, 464, and the electrical slots 482, 484 may be fabricated from an electrically conductive material, such as a copper alloy or other metal or electrically-conductive material. In an exemplary embodiment, the positive terminal annular lug 452, the positive conductive line 472, and the positive electrical prong 462 may be fabricated as a single, unitary, electrically-conductive component. Additionally, the negative terminal annular lug 454, the negative conductive line 474, and the negative electrical prong 464 may also be fabricated as a single, unitary, electrically-conductive component.

The side mount clamp housing 456 may optionally be bonded to the case wall 221 of the side terminal automotive battery 220, as indicated by a bond interface 458. In yet another alternative embodiment, the side mount clamp housing 456 may be fabricated or formed as a unit with the side terminal automotive battery 220, as the material forming the side mount clamp housing 456 can be the same flexible, plastic-based material from which the case wall 221 of the side terminal automotive battery 220 is formed.

Figure 30:
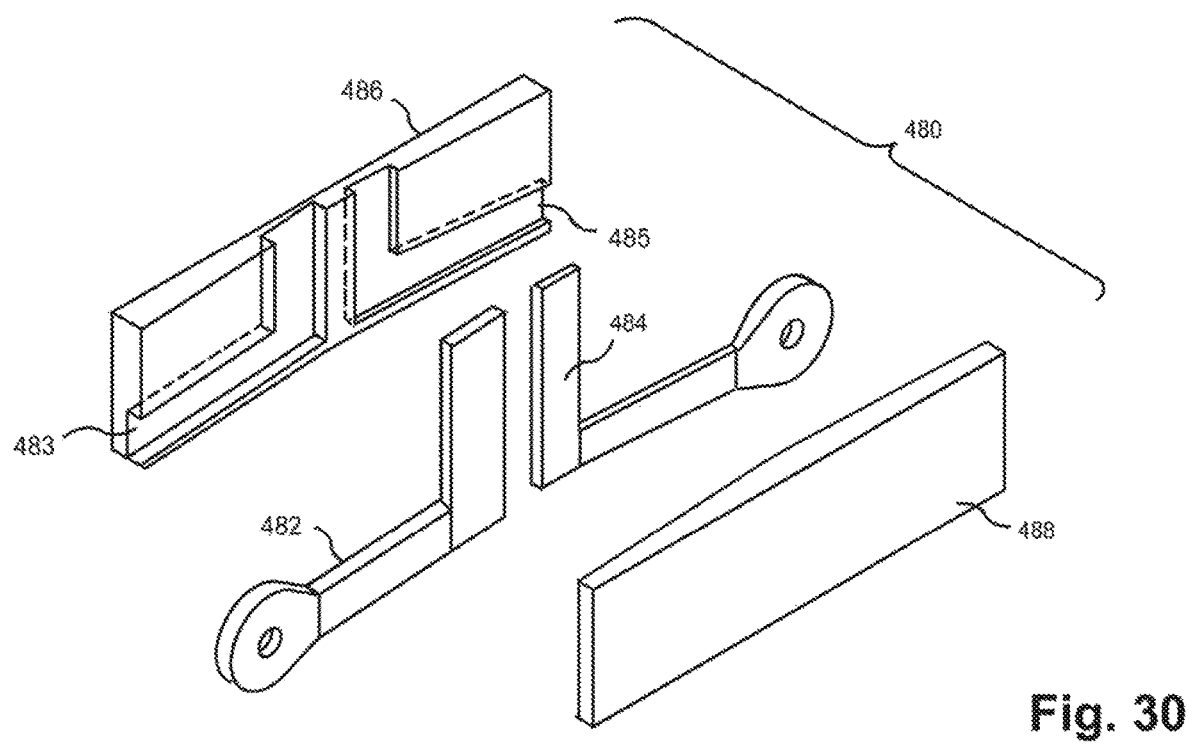
FIG. 30 is an exploded isometric diagrammatical view of the automotive battery side mount clamp of FIG. 28 having a two-piece clamp housing.

FIG. 30 shows an automotive battery side mount clamp 480 fabricated as four individual components to aid in installation and removal of the automotive battery side mount clamp 480. The automotive battery side mount clamp 480 includes an electrically conductive positive conductor L-bar 482, an electrically conductive negative conductor L-bar 484, an electrically non-conductive back plate 486, and electrically non-conductive front plate 488. Assembly and installation of the automotive battery side mount clamp 480 includes the steps of: (i) placing the positive conductor L-bar 482 into a positive conductor recess 483 in the back plate 486, (ii) placing the negative conductor L-bar 484 into a negative conductor recess 485 in the back plate 486, and (iii) securing the front plate 488 to the back plate 486 using mechanical fasteners or a snap-fit configuration (not shown), as is well known in the relevant art.

Figure 31:
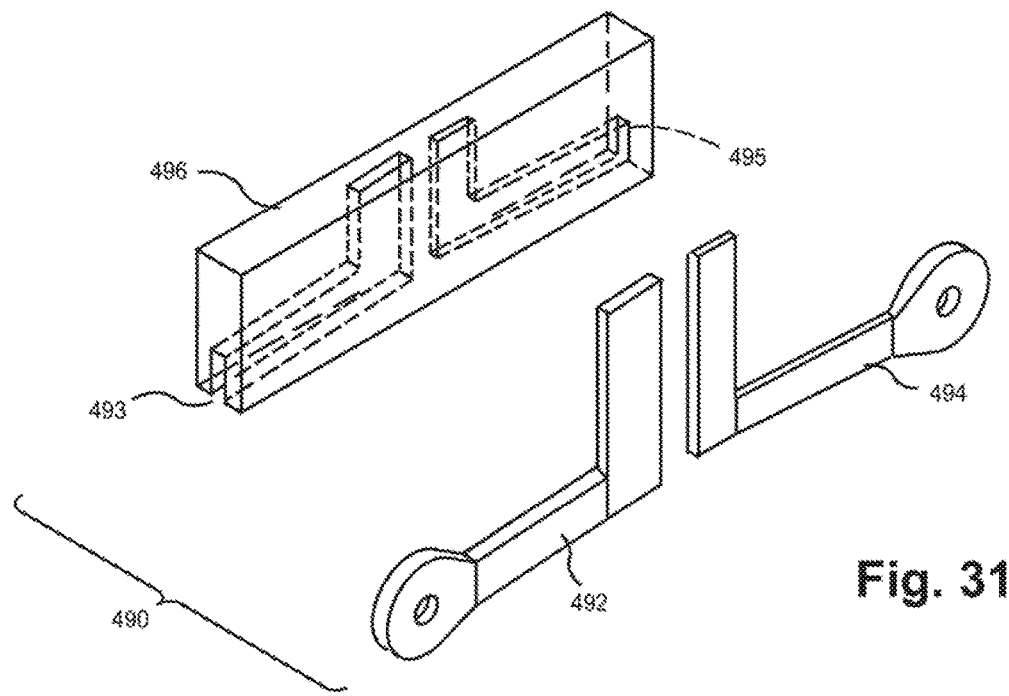
FIG. 31 is an exploded isometric diagrammatical view of the automotive battery side mount clamp of FIG. 28 having a two-cavity clamp housing.

FIG. 31 shows an automotive battery side mount clamp 490 fabricated as three individual components to aid in installation and removal of the automotive battery side mount clamp 490. The automotive battery side mount clamp 490 includes an electrically conductive positive conductor L-bar 492, an electrically conductive negative conductor L-bar 494, and an electrically non-conductive side clamp slotted housing 496. The side clamp slotted housing 496 includes a positive conductor cavity 493 and a negative conductor cavity 495, sized and shaped as shown. Assembly and installation of the automotive battery side mount clamp 480 includes the steps of: (i) inserting the positive conductor L-bar 492 into the positive conductor cavity 493, and (ii) inserting the negative conductor L-bar 494 into the negative conductor cavity 495.

Figure 32:
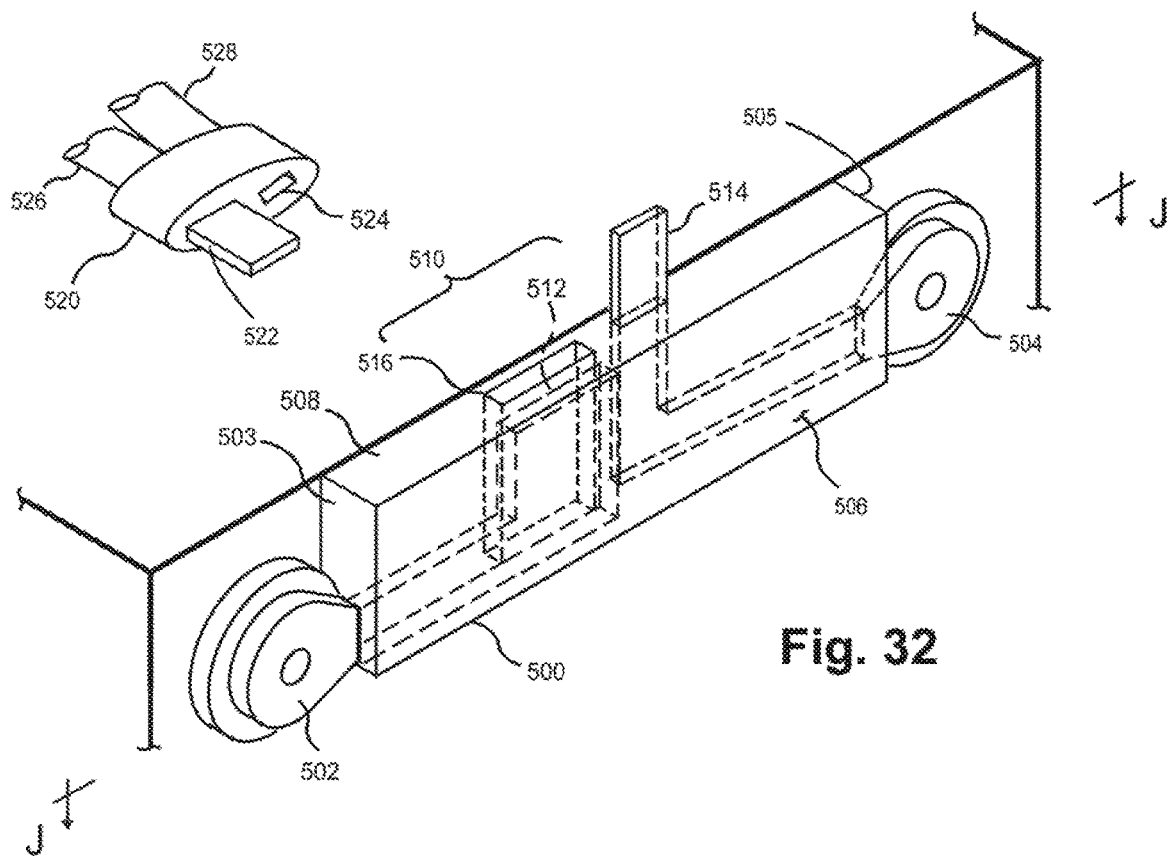
FIG. 32 is an isometric diagrammatical view of an automotive battery side mount clamp having a slot/prong configured electrical receptacle, in accordance with an aspect of the present invention.

In an alternative configuration, a booster cable system comprises a booster cable with an electrical receptacle having both a prong and a contact opening, and a battery clamp with an electrical plug having both a prong and a contact opening. As shown in FIG. 32, an automotive battery side mount clamp 500 includes a housing hybrid electrical connector 510 having a positive contact opening 516 extending into a top surface 508 of a side mount clamp housing 506, and a negative electrical prong 514 extending from the top surface 508. A positive contact pad 512 is secured inside the positive electrical contact opening 516. The housing hybrid electrical connector 510 is configured to electrically mate with a booster hybrid booster connector 520.

The hybrid booster connector 520 includes a positive insulated conductor 526 terminating in a positive electrical prong 522, and a negative insulated conductor 528 terminating in a negative electrically-conductive slot 524. The insulated conductors 526, 528 conduct charging power from an external source of direct current electricity (not shown). Mating of the hybrid booster connector 520 with the hybrid housing connector 510 places the positive electrical prong 522 into physical and electrical contact with the positive contact pad 512, and places the negative electrical prong 514 into physical and electrical contact with the negative electrically-conductive slot 524.

Figure 33:
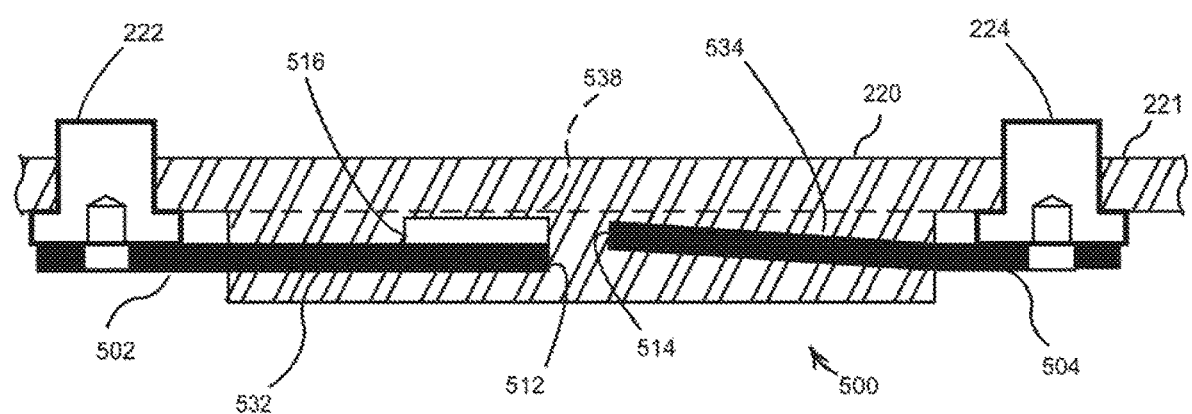
FIG. 33 is a cross-sectional view of the automotive battery side mount clamp of FIG. 32.

As seen with additional reference to the cross sectional view J-J in FIG. 33, the automotive battery side mount clamp 500 includes a positive conductive line 532 electrically connecting the positive terminal annular lug 502 to the positive contact pad 512, and a negative conductive line 534 electrically connecting the negative terminal annular lug 504 to the negative electrical prong 514. The terminal annular lugs 502, 504, the conductive lines 532, 534, the positive contact pad 512, the negative electrically-conductive slot 524, and the electrical prongs 514, 522 may be fabricated from an electrically conductive material, such as a copper alloy or other metal or electrically-conductive material.

In an exemplary embodiment, the positive terminal annular lug 502, the positive conductive line 532, and the positive contact pad 512 may be fabricated as a single, unitary, electrically-conductive component. Additionally, the negative terminal annular lug 504, the negative conductive line 534, and the negative electrical prong 514 may also be fabricated as a single, unitary, electrically-conductive component. Mating of the hybrid electrical connector 520 with the hybrid housing connector 510 completes a first electrical path from the positive insulated conductor 526 to the positive battery side terminal 222, and a second electrical path from the negative battery side terminal 224 to the negative insulated conductor 528.

The side mount clamp housing 506 may optionally be bonded to the case wall 221 of the side terminal automotive battery 220, as indicated by a bond interface 538. In yet another alternative embodiment, the side mount clamp housing 506 may be fabricated or formed as a unit with the side terminal automotive battery 220, as the material forming the side mount clamp housing 506 can be the same flexible, plastic-based material from which the case wall 221 of the side terminal automotive battery 220 is formed.

Figure 34:
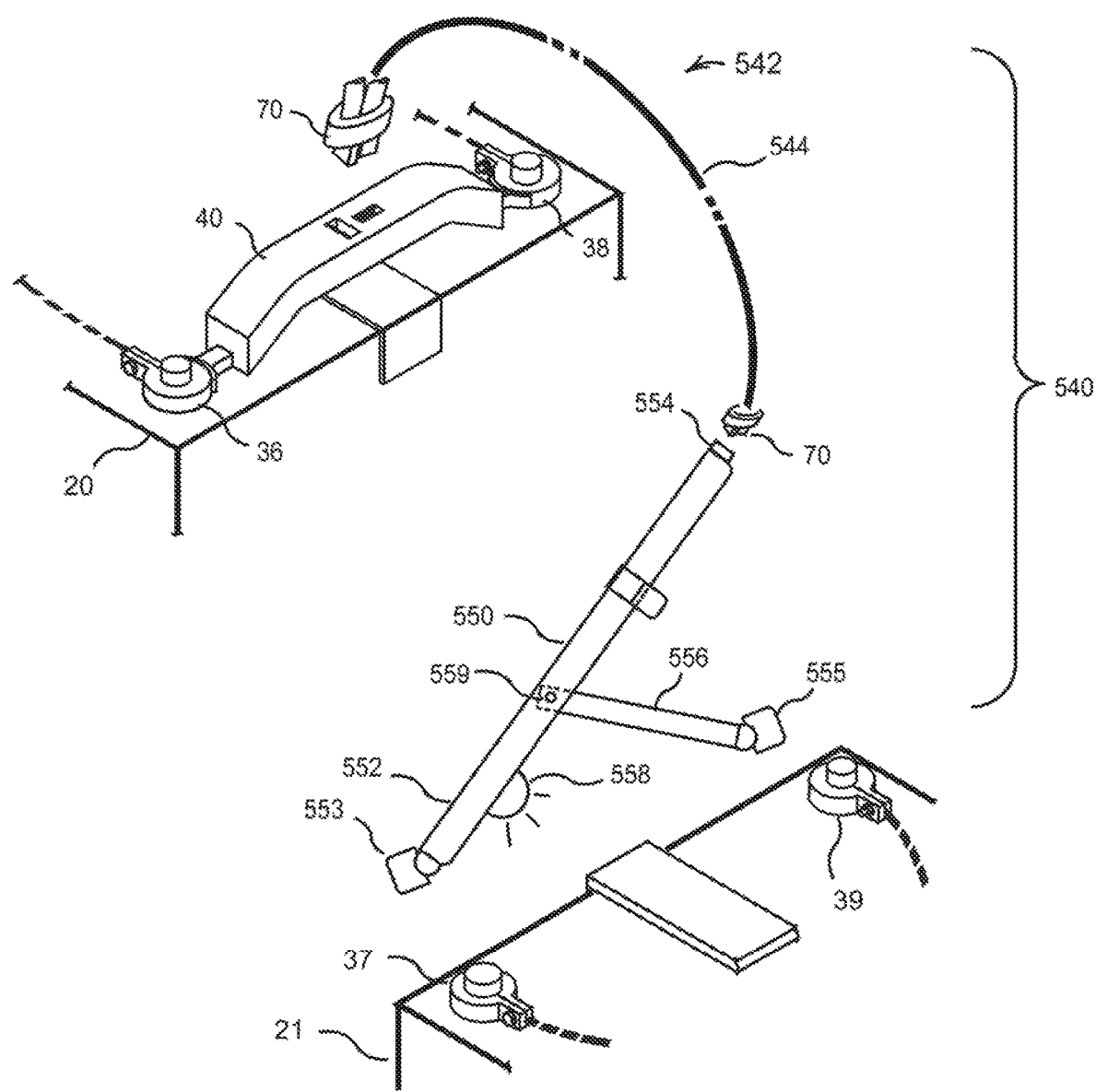
FIG. 34 is an isometric diagrammatical view of a booster cable system including a cable assembly with two plugs, the automotive battery transverse clamp of FIG. 3 on a first terminal post automotive battery, and a compact battery clamp on a second terminal post automotive battery.

There is shown in FIG. 34 an exemplary embodiment of a booster cable assembly 540 as may be used in charging a discharged battery 21 with the charged battery 20, for example. The booster cable assembly 540 includes a booster cable set 542 having a high-amperage, two-conductor, insulated electrical cable pair 544, or an equivalent insulated cable pair, with a first electrical booster plug 70 at a first end of the insulated electrical cable pair 544 and a second electrical booster plug 70 at a second end of the insulated electrical cable pair 544. This jump-start scenario is applicable when the vehicle having the automotive battery transverse clamp 40 on the post-type automotive battery 20 is providing charging current to a vehicle having a conventional battery 21 without a transverse battery clamp.

In the illustration, the first electrical booster plug 70 is being inserted into the automotive battery transverse clamp 40, and the second electrical booster plug 70 is being attached to a compact booster cable clamp 550, described in U.S. Pat. No. 9,178,292. The compact booster cable clamp 550 includes a first terminal contact pad 553 on a booster clamp contact handle 552 for placement against the positive battery terminal clamp 37, and a second terminal contact pad 555 on a booster clamp contact arm 556 for placement against the negative battery terminal clamp 39. The booster clamp contact handle 552 is hingedly connected to the booster clamp contact arm 556 by a pivot pin 559.

A source of illumination 558, powered by the automotive battery 20, may be provided on the compact booster cable clamp 550 to aid in proper installation of the compact booster cable clamp 550 under poor visibility conditions. This modular configuration of the booster cable assembly 540 provides for quick and easy disassembly and storage, without the common problem of "crocodile clip" clamps tangled with an uncoiled electrical cable.

Figure 35:
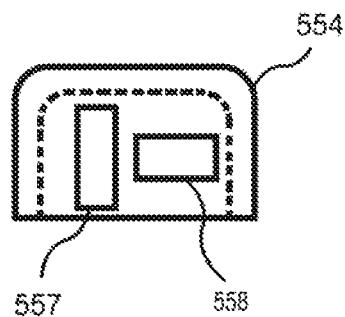
FIG. 35 is an end view of an electrical connector having receptacle sockets aligned at an angle to one another, as can be used on the compact battery clamp of FIG. 34.

It can be appreciated by one skilled in the art that, for an alternative application, the booster cable set 542 can be replaced by a cable set having a different combination of connectors at the ends. A cable clamp socket 554 used on the compact booster cable clamp 550 has a positive electrical contact opening 557 and a negative electrical contact opening 558, where the positive electrical contact opening 557 is oriented at a right angle to the negative electrical contact opening 558, as shown in FIG. 35.

Figure 36:
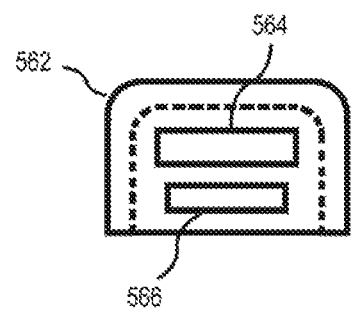
FIG. 36 is an end view of an electrical connector having parallel receptacle sockets, as can be used on the compact battery clamp of FIG. 34.

In place of the cable clamp socket 554, a cable clamp socket 562, shown in FIG. 36, can be used on the compact booster cable clamp 550. The cable clamp socket 562 has a positive electrical contact opening 564 and a negative electrical contact opening 566. The positive electrical contact opening 564 is dimensionally different from the negative electrical contact opening 566. This provides for a polarized socket configuration, similar to the electrical booster receptacle 140, shown in FIG. 11.

Figure 37:
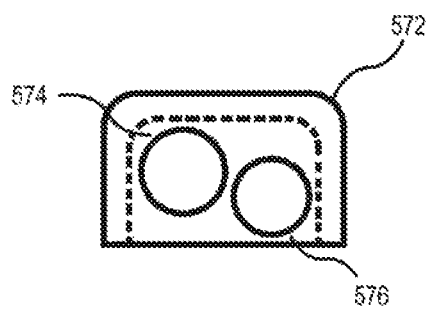
FIG. 37 is an end view of an electrical connector having cylindrical receptacle sockets, as can be used on the compact battery clamp of FIG. 34.

Alternatively, a cable clamp socket 572, shown in FIG. 37, can be used in place of the cable clamp socket 562 or the cable clamp socket 554 on the compact booster cable clamp 550. The cable clamp socket 572 has a positive cylindrical electrical contact opening 574 and a smaller negative cylindrical electrical contact opening 576 to provide a polarized socket configuration, similar to the configuration of the electrical booster receptacle 200, shown in FIG. 14.

Figure 38:
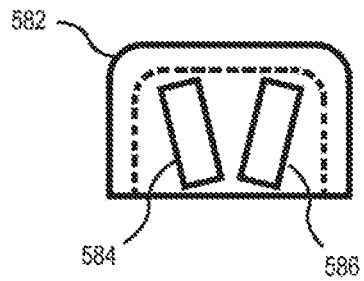
FIG. 38 is an end view of an electrical connector having receptacle sockets aligned at an angle to one another, as can be used on the compact battery clamp of FIG. 34.

In yet another alternative embodiment, a cable clamp socket 582, shown in FIG. 38, can be used in place of any of the cable clamp sockets 556, 562 or 572 on the compact booster cable clamp 550. The cable clamp socket 582 has a positive electrical contact slot 584 oriented at an angle to a negative electrical contact slot 586 to provide a polarized socket configuration, similar to the polarized electrical booster receptacle 240, shown in FIG. 18.

Figure 39:
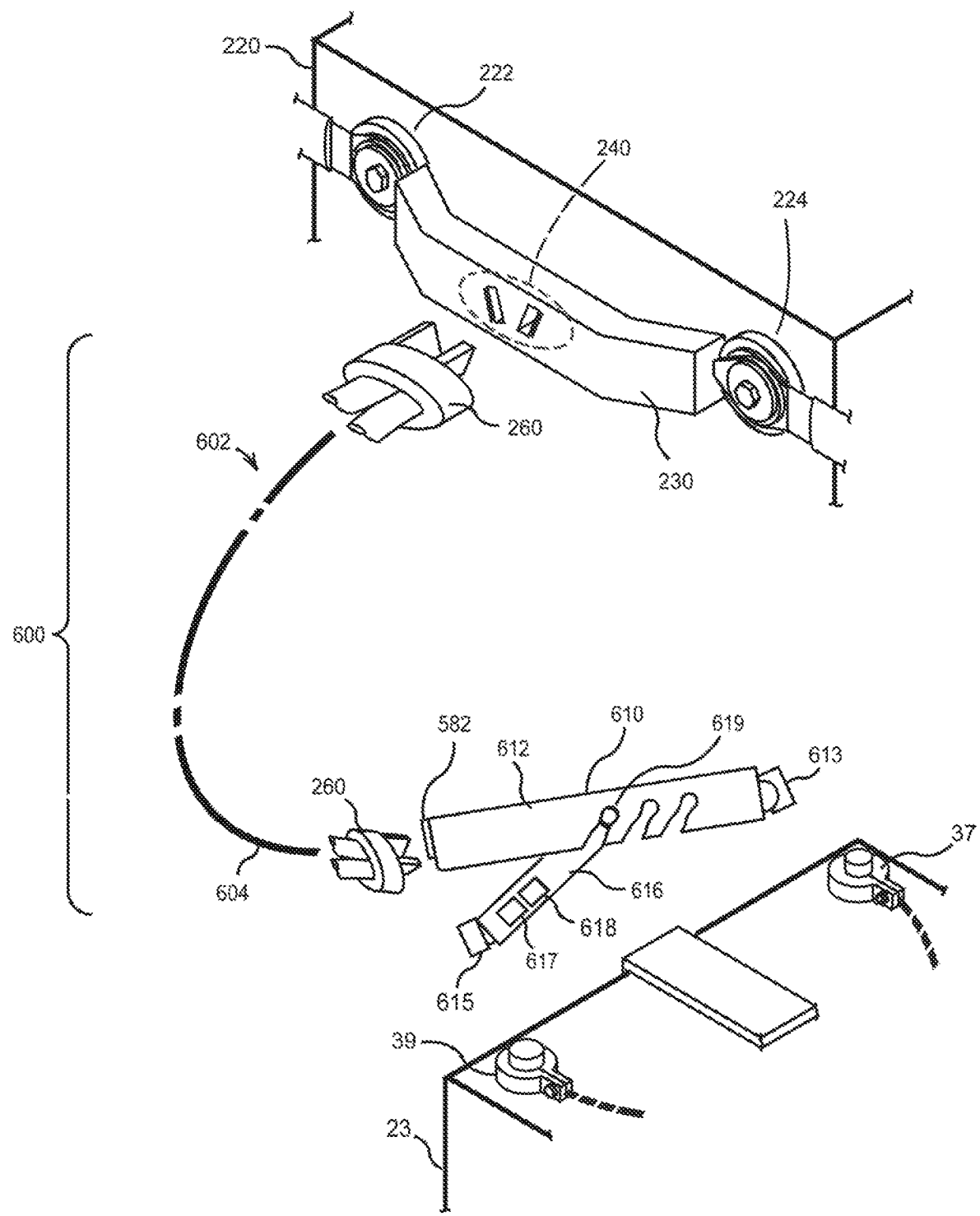
FIG. 39 is an isometric diagrammatical view of a booster cable system including a cable assembly with two plugs, the automotive battery side mount clamp of FIG. 18 on a side mount terminal automotive battery, and a polarized battery clamp on a terminal post automotive battery.

There is shown in FIG. 39 an exemplary embodiment of a booster cable assembly 600 as may be used in charging a discharged battery 23 with the charged battery 220, for example. The booster cable assembly 600 includes a booster cable set 602 having a high-amperage, two-conductor, insulated electrical cable pair 604, or an equivalent insulated cable pair, with a first electrical booster plug 260 at a first end of the insulated electrical cable pair 604 and a second electrical booster plug 260 at a second end of the insulated electrical cable pair 604. This jump-start scenario is applicable when the vehicle having the automotive battery side mount clamp 230 on the side-mount automotive battery 220 is providing charging current to a vehicle having the conventional battery 23 without a transverse battery clamp.

In the illustration, the first electrical booster plug 260 is being inserted into the automotive battery side mount clamp 230, and the second electrical booster plug 260 is being attached to a polarized booster cable clamp 610, described in U.S. Pat. No. 9,815,378. The polarized booster cable clamp 610 includes a first terminal contact pad 613 on a booster clamp contact handle 612 for placement against the positive battery terminal clamp 37, and a second terminal contact pad 615 on a booster clamp contact arm 616 for placement against the negative battery terminal clamp 39. The booster clamp contact handle 612 is removably connected to the booster clamp contact arm 616 by a stepped pivot pin 619. The cable clamp socket 582 is provided on the booster clamp contact handle 612 for attachment to the booster cable set 602.

The polarized booster cable clamp 610 may include a first indicator light 617 of a first color and a second indicator light 618 of a second color, emplaced substantially as shown. The first indicator light 617 illuminates when the user attempts to place the terminal contact pads 613, 615 on the wrong battery cable clamps 37, 39. The first indicator light 617 thus provides a warning that the polarized battery clamp 610 should be removed from the battery cable clamps 37, 39, reversed, and replaced on the battery 23. The indicator light 618 illuminates when the user correctly positions the polarized booster cable clamp 610 on the battery 23.

In addition, an internal ground fault interrupter (not shown) may be included inside the polarized battery clamp 610 to prevent or shut down a surge of electrical current passing through the polarized battery clamp 610 in the case where the user of the polarized battery clamp 610 is unfamiliar with proper electrical polarity. The modular configuration of the booster cable assembly 600 provides for quick and easy disassembly and storage, without having the nuisance of haphazardly-bundled electrical cables entangled with the "crocodile clip" battery clamps. It can be appreciated by one skilled in the art that, for an alternative application, cable clamp connectors 554, 562, or 582, shown above, can be used on the polarized booster cable clamp 610.

Figure 40:
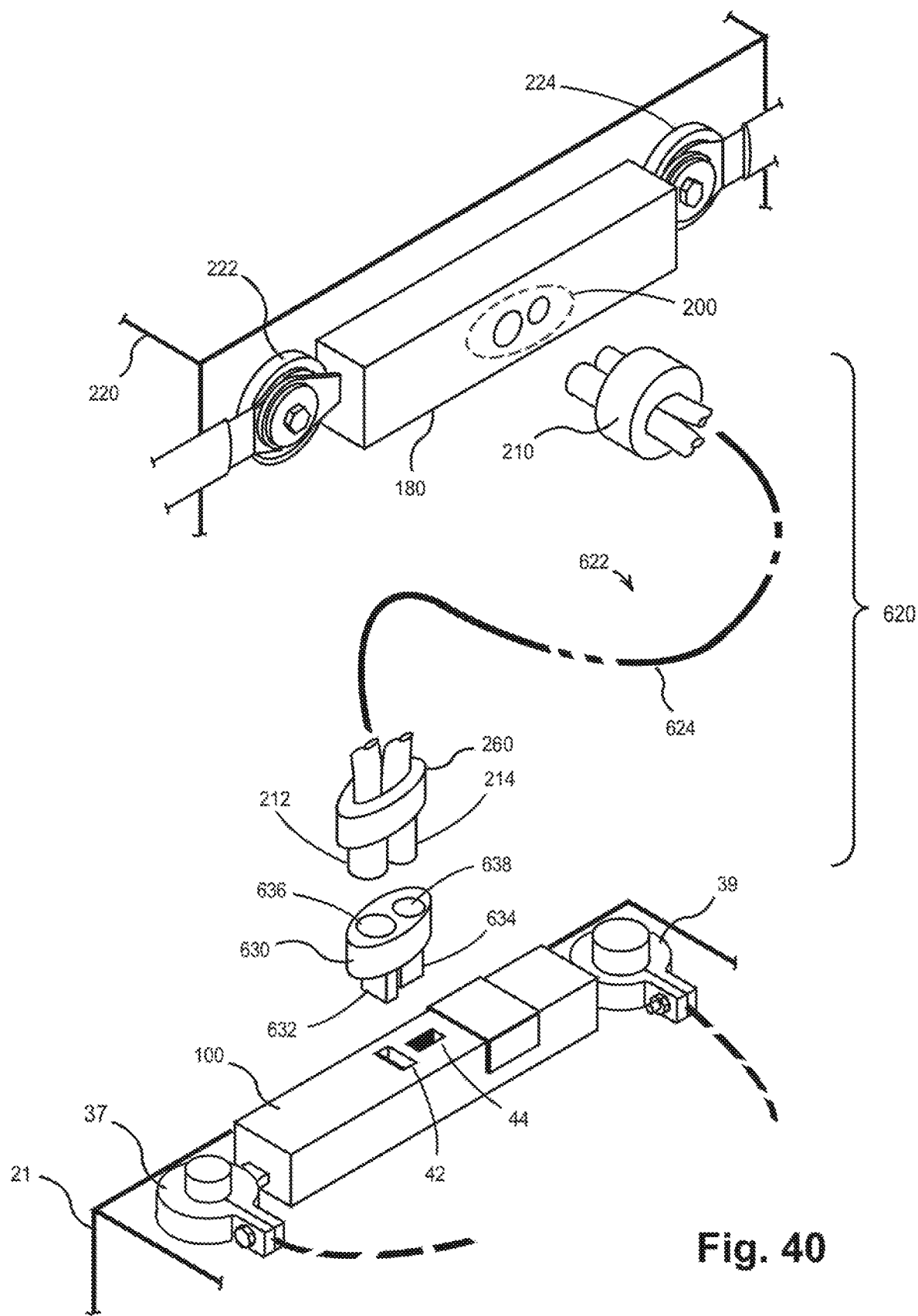
FIG. 40 is an isometric diagrammatical view of a booster cable system including a cable assembly with two plugs, an automotive battery side mount clamp with cylindrical receptacle sockets on a side mount terminal automotive battery, the automotive battery transverse clamp of FIG. 8 on a terminal post automotive battery and a connector adapter at the terminal post automotive battery.

There is shown in FIG. 40 an exemplary embodiment of a booster cable assembly 620 as may be used in charging the discharged battery 21 with the charged battery 220, for example. The booster cable assembly 620 includes a booster cable set 622 having a high-amperage, two-conductor, insulated electrical cable pair 624, or an equivalent insulated cable pair, with a first electrical booster plug 210 at a first end of the insulated electrical cable pair 604 and a second electrical booster plug 260 at a second end of the insulated electrical cable pair 604. This jump-start scenario is applicable when the vehicle having the automotive battery side mount clamp 180 on the side-mount automotive battery 220 is providing charging current to a vehicle having the flush mounted automobile battery transverse clamp 100 installed on the post-type battery 21.

In the illustration, the first electrical booster plug 210 is being inserted into the electrical booster receptacle 200 in the automotive battery side mount clamp 180, and the second electrical booster plug 260 is being attached to an electrical plug adapter 630 for insertion into the flush mounted automobile battery transverse clamp 100. The electrical plug adapter 630 includes a positive electrically-conductive cylindrical contact 636 for mating with the positive electrical prong 212, and a negative electrically-conductive cylindrical contact 638 for mating with the negative electrical prong 214.

The positive electrically-conductive cylindrical contact 636 is electrically coupled to a positive electrical prong 632, and the negative electrically-conductive cylindrical contact 638 is electrically coupled to a negative electrical prong 634. The positive electrical prong 632 is configured for insertion into the positive electrical contact opening 42 of the flush mounted automobile battery transverse clamp 100, and the negative electrical prong 634 is configured for insertion into the negative electrical contact opening 44.

In an alternative embodiment, the flush mounted automobile battery transverse clamp 100 can be modified by using the electrical booster receptacle 200 in place of the electrical contact openings 42, 44. In this case, the booster cable set 622 can be used alone to electrically connect the side-mount automotive battery 220 to the post-type battery 21. The electrical plug adapter 630 is not required in this alternative embodiment.

The modular configuration of the booster cable assembly 620 provides for quick and easy disassembly and storage and, when used with one or more adapters, can be used in the routing task of jump starting an automotive car battery without requiring the "crocodile clip" battery clamps. The convenient booster cable assembly 620 allows for quick connection, and disconnection, and prevents the incorrect connection because of the polarized components.

It is to be understood that the description herein is only exemplary of the invention, and is intended to provide an overview for the understanding of the nature and character of the disclosed booster cable assemblies and component configurations. The accompanying drawings are included to provide a further understanding of various features and embodiments of the method and devices of the invention which, together with their description and claims serve to explain the principles and operation of the invention.

What is claimed is:

1. An automotive booster cable system suitable for use in jump starting an automobile, said system comprising:
 a first battery clamp for mounting on a first battery, said first battery clamp including a first clamp housing with a first electrical contact pad in a first electrical contact opening in said first clamp housing, and with a first terminal contact extending from an end of said first clamp housing, said first terminal contact electrically connected to said first electrical contact pad by a first conductive line enclosed within said first clamp housing, said first terminal contact configured to electrically mate with a first battery terminal on the first battery;
 a second battery clamp for mounting on a second battery, said second battery clamp including a second clamp housing with a second electrical contact pad in a second electrical contact opening in said second clamp housing, and with a second terminal contact extending from an end of said second clamp housing, said second terminal contact electrically connected to said second electrical contact pad by a second conductive line enclosed within said second clamp housing, said second terminal contact configured to electrically mate with a second battery terminal on a second battery;
 an electrical plug adapter having a first polarized adapter electrical connector at a first end and a second polarized adapter electrical connector at a second end; and
 a booster cable assembly having a first polarized electrical booster connector at a first end of a length of an electrical conductor pair and a second polarized electrical booster connector at a second end of said electrical conductor pair, said electrical conductor pair being of sufficient cross sectional areas to conduct charging current, said first polarized electrical booster connector adapted to electrically mate with said first electrical contact pad in said first battery clamp, and said second polarized electrical booster connector adapted to electrically mate with either said second battery clamp or said electrical plug adapter;
 such that, when (i) said first battery clamp has been mounted on the first battery, (ii) said second battery clamp has been mounted on the second battery, (iii) said first polarized electrical booster connector has been mated to said first electrical contact pad in said first battery clamp, and (iv) said second polarized electrical booster connector has been mated to said second electrical contact pad in said second battery clamp, an electrical path is established between the charged battery terminal and the discharged battery terminal to enable charging current to flow between the first battery and the second battery;
 such that, when (i) said first battery clamp has been mounted on the first battery, (ii) said second battery clamp has been mounted on the second battery, (iii) said first polarized electrical booster connector has been mated to said first electrical contact pad in said first battery clamp, (iv) said second polarized electrical booster connector has been mated to one end of said electrical plug adapter, (v) another end of said electrical plug adapter has been mated to said second electrical contact pad in said second battery clamp, an electrical path is established between the first battery terminal on the first battery and the second battery terminal on the second battery to enable charging current to flow between the first battery and the second battery.

2. The system of claim 1 wherein,
 said first battery clamp further includes a third electrical contact pad in a third electrical contact opening in said first clamp housing, and with a third terminal contact extending from a second end of said first clamp housing, said third terminal contact electrically connected to said third electrical contact pad by a third conductive line enclosed within said first clamp housing, said third terminal contact configured to electrically mate with a third battery terminal on the first battery; and
 said second battery clamp further includes a fourth electrical contact pad in a fourth electrical contact opening in said second clamp housing, and with a fourth terminal contact extending from a second end of said second clamp housing, said fourth terminal contact electrically connected to said fourth electrical contact pad by a fourth conductive line enclosed within said second clamp housing, said fourth terminal contact configured to electrically mate with a fourth battery terminal on the second battery;
 whereby, a second electrical charging path is established between the third battery terminal on the first battery and the fourth battery terminal on the second battery.

\* \* \* \* \*